US012618010B2

(12) United States Patent
Kersey

(10) Patent No.: US 12,618,010 B2
(45) **Date of Patent: *May 5, 2026**

(54) METHOD AND SYSTEM FOR FLOTATION SEPARATION IN A MAGNETICALLY CONTROLLABLE AND STEERABLE MEDIUM

(71) Applicant: CiDRA Corporate Services LLC, Wallingford, CT (US)

(72) Inventor: Alan D. Kersey, South Glastonbury, CT (US)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 100 days.

This patent is subject to a terminal disclaimer.

(21) Appl. No.: 16/363,447

(22) Filed: Mar. 25, 2019

(65) Prior Publication Data

US 2023/0041631 A1 Feb. 9, 2023

Related U.S. Application Data

(63) Continuation of application No. 15/782,125, filed on Oct. 12, 2017, now abandoned, which is a continuation of application No. 14/380,609, filed as application No. PCT/US2013/028303 on Feb. 28, 2013, now Pat. No. 9,932,525.

(60) Provisional application No. 61/604,088, filed on Feb. 28, 2012.

(51) Int. Cl.

| | |
|---|---|
| ***C10G 1/04*** | (2006.01) |
| ***B03D 1/02*** | (2006.01) |
| ***B03D 1/08*** | (2006.01) |
| ***B03D 1/14*** | (2006.01) |
| ***B03D 1/22*** | (2006.01) |
| ***B03D 1/24*** | (2006.01) |
| *B03D 1/18* | (2006.01) |

(52) U.S. Cl.

CPC ................. *C10G 1/04* (2013.01); *B03D 1/02* (2013.01); *B03D 1/023* (2013.01); *B03D 1/028* (2013.01); *B03D 1/082* (2013.01); *B03D 1/1456* (2013.01); *B03D 1/1475* (2013.01); *B03D 1/22* (2013.01); *B03D 1/24* (2013.01); *B03D 1/18* (2013.01); *B03D 2203/006* (2013.01)

(58) Field of Classification Search

CPC .... B03D 1/023; B03D 1/028; B03D 2201/04; B03D 2203/006; C10G 1/04; C10G 1/045

See application file for complete search history.

(56) References Cited

U.S. PATENT DOCUMENTS

| | | | | |
|---|---|---|---|---|
| 3,627,678 A * | 12/1971 | Marston | B03C 1/025 210/695 |
| 4,172,025 A * | 10/1979 | Porteous | C10G 1/047 208/429 |
| 4,343,694 A * | 8/1982 | Cook | B03B 9/00 209/214 |
| 5,167,375 A * | 12/1992 | Datta | B03D 1/087 241/38 |
| 5,192,423 A | 3/1993 | Duczmal et al. | |
| 2003/0104359 A1 | 6/2003 | Cuthbertson et al. | |
| 2010/0193408 A1* | 8/2010 | Jameson | B03D 1/242 209/164 |
| 2010/0279322 A1 | 11/2010 | Tang et al. | |
| 2010/0300941 A1 | 12/2010 | Domke et al. | |
| 2014/0166585 A1* | 6/2014 | Rothman | B03D 1/0046 210/703 |

FOREIGN PATENT DOCUMENTS

WO 2012166580 12/2012

OTHER PUBLICATIONS

P. Brown et al., Magnetic Control over Liquid Surface Properties with Responsive Surfactants, 51 Angew. Chem. Int. Ed. 2414-2416 (2012)).*

Brown et al. Magnetic Control over Liquid Surface Properties with Responsive Surfactants. Angew. Chem. Int. Ed. 51: 1-4,2012. [retrieved on Apr. 6, 2013). Retrieved from the Internet . . <URL: http://www.magneticmicrosphere.com/ckfinder/userfiles/files/Brown_magnetic_detergent_2012.pdf>. entire document.

J. Peng, et al; "Novel Magnetic Demulsifier for Water Removal from Diluted Bitumen Emulsion"; 26 Energy Fuels; 2011; pp. 2705-2710.

* cited by examiner

*Primary Examiner* — Randy Boyer

(74) *Attorney, Agent, or Firm* — William J. Barber; WARE FRESSOLA MAGUIRE & BARBER LLP

(57) ABSTRACT

The present invention provides new techniques related to magnetically controllable and/or steerable froth for use in separation processes of mineral-bearing ore and bitumen. Apparatus is provided featuring a processor configured to contain a fluidic medium having a material-of-interest and also having a surfactant with magnetic properties so as to cause the formation of a froth layer that contains at least some of the material-of-interest and is magnetically responsive; and a magnetic field generator configured to generate a magnetic field and provide non-mechanical mixing and steering/driving of the froth layer in the processor. The material-of-interest may be mineral-bearing ore particles or bitumen. The processor includes a flotation tank, a primary separation vessel (PSV), or a pipe, including a tailings pipeline. The pipe has a non-magnetic pipe section, and the magnetic field generator includes a magnetic coil arranged in relation to non-magnetic pipe section to generate the magnetic field and provide the non-mechanical mixing and steering/driving of the froth layer in the pipe.

13 Claims, 23 Drawing Sheets

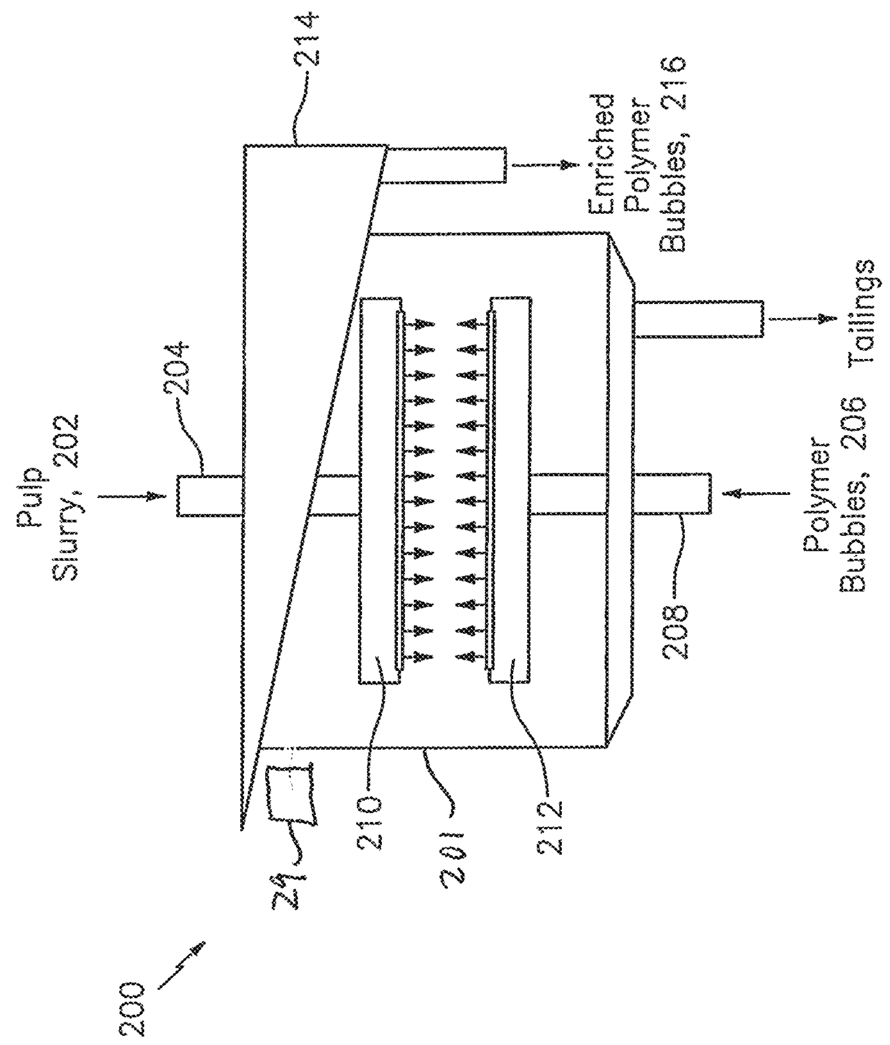
*FIG. 2a* Alternative Flotation Cell or Column

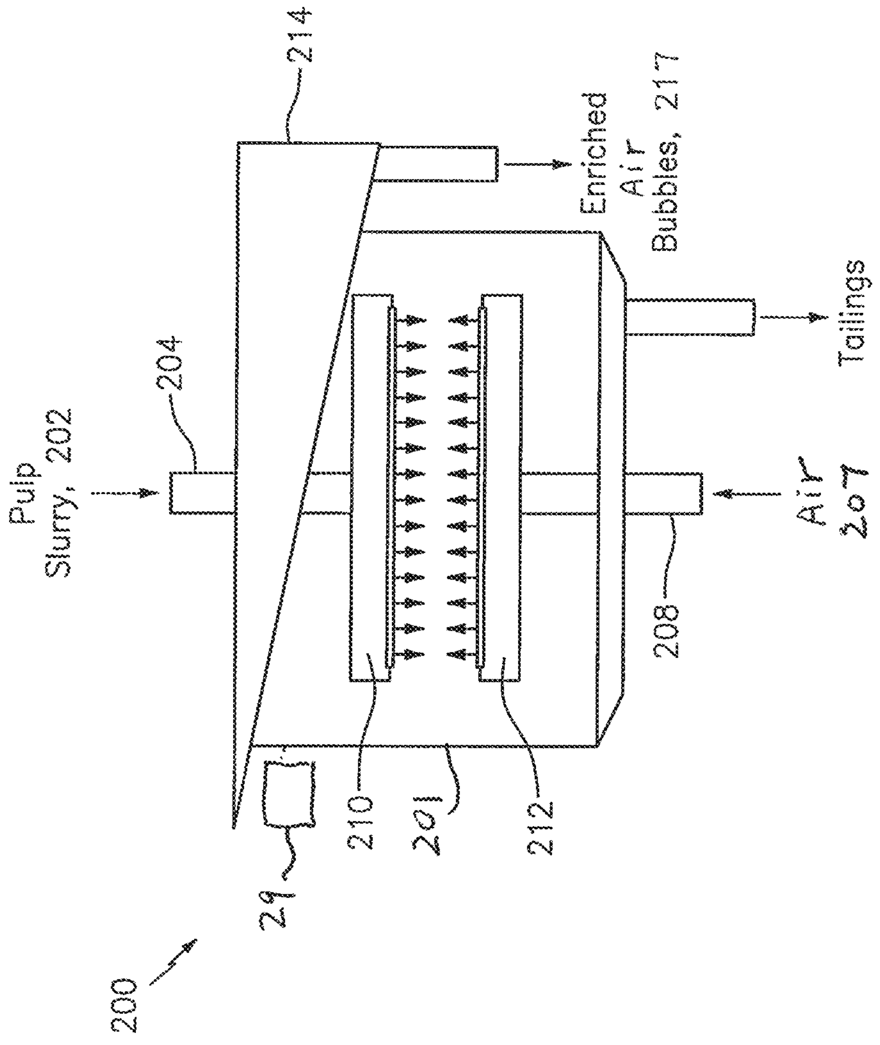
FIG. 2b Alternative Flotation Cell or Column

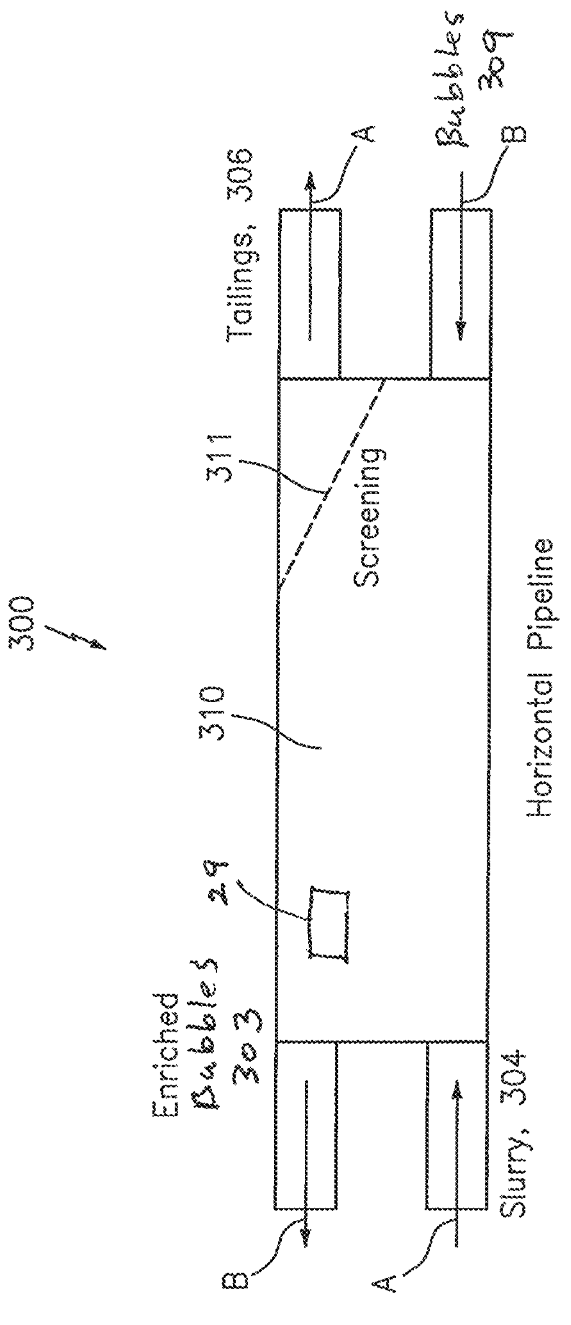
*FIG. 7*: Separation of Sized-Based Bubbles or Beads Using Countercurrent Flows with Mixing

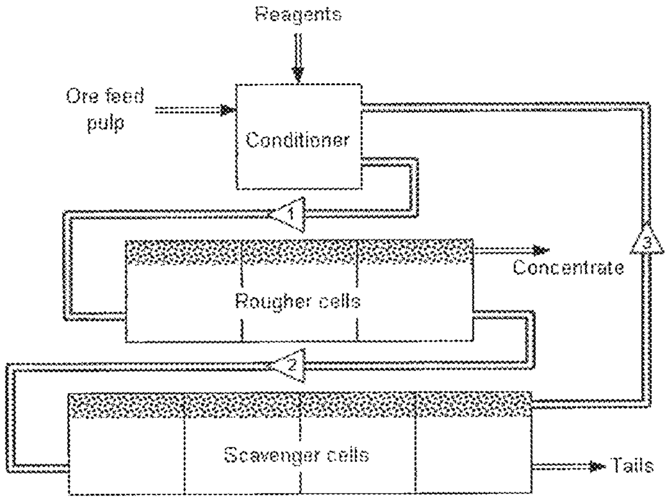
Figure 12a (Prior art): Typical Flotation circuit
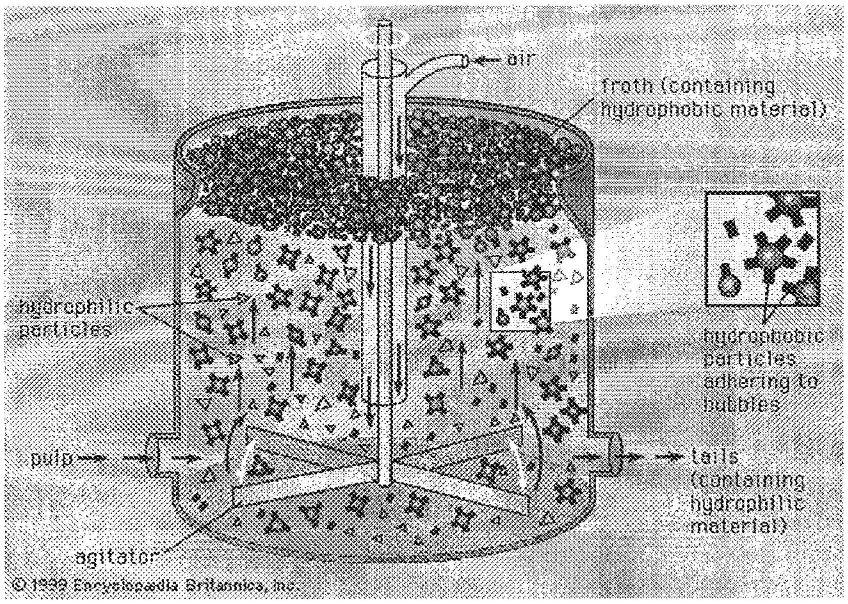
Figure 12b (Prior art): Dynamics of a flotation cell

METHOD AND SYSTEM FOR FLOTATION SEPARATION IN A MAGNETICALLY CONTROLLABLE AND STEERABLE MEDIUM

CROSS-REFERENCE TO RELATED APPLICATIONS

This application is a continuation patent application that claims benefit to patent application Ser. No. 15/782,125, filed 12 Oct. 2017, which itself claims benefit to an earlier-filed continuation patent application Ser. No. 14/380,609, filed 23 Oct. 2014, which corresponds to international patent application serial no. PCT/US2013/028303, filed 28 Feb. 2013, which claims benefit to Provisional Patent Application No. 61/604,088, filed 28 Feb. 2012, and U.S. Provisional Patent Application No. 61/616,604, filed Mar. 28, 2012, which is incorporated by reference in their entirety.

This application is also related to the following nine PCT applications, which are all concurrently filed on 25 May 2012 as follows:

- PCT application no. PCT/US12/39591, entitled "Method and system for releasing mineral from synthetic bubbles and beads,"
- PCT application no. PCT/US12/39528, entitled "Flotation separation using lightweight synthetic bubbles and beads;"
- PCT application no. PCT/US12/39524, entitled "Mineral separation using functionalized polymer membranes;"
- PCT application no. PCT/US12/39540, entitled "Mineral separation using sized, weighted and magnetized beads;"
- PCT application no. PCT/US12/39576, entitled "Synthetic bubbles/beads functionalized with molecules for attracting or attaching to mineral particles of interest;"
- PCT application no. PCT/US/39596, entitled "Synthetic bubbles and beads having hydrophobic surface;"
- PCT application no. PCT/US12/39631, entitled "Mineral separation using functionalized filters and membranes; ".
- PCT application no. PCT/US12/39655, entitled "Mineral recovery in tailings using functionalized polymers;" and
- PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Description of Related Art

Flotation processing for the separation of materials is a widely utilized technology, particularly in the fields of minerals recovery, industrial waste water treatment, and paper recycling for example.

Mineral Separation

In the case of minerals separation, the mineral bearing ore is crushed and ground to a size, typically around 100 microns, such that a high degree of liberation occurs between the ore minerals and the gangue (waste) material. In the case of copper mineral extraction as an example, the ground ore is then wet, suspended in a slurry, or 'pulp', and mixed with reagents such as xanthates or other reagents, which render the copper sulfide particles hydrophobic.

In many industrial processes, froth flotation is used to separate valuable or desired material from unwanted material (e.g., gangue). In effect, flotation works by taking advantage of differences in the hydrophobicity of the mineral-bearing ore particles and the waste gangue. By way of example, in this process a mixture of water, valuable material, unwanted material, chemicals and air is placed into a flotation cell. In particular, a pulp slurry of hydrophobic particles and hydrophilic particles may be introduced to a water filled tank containing surfactant which is aerated, creating bubbles. The chemicals are used to make the desired material hydrophobic and the air is used to carry the material to the surface of the flotation cell. When the hydrophobic material and the air bubbles collide they become attached to each other. The bubble rises to the surface carrying the desired material with it, forming a froth. The froth is removed and the concentrate is further refined. The surfactant is key in the generation of the froth, and the quality and physical and chemical properties of the froth are essentially important in determining the efficiency of the separation process.

In flotation separation processes, multiple stages of flotation are used: For example, see the flotation circuit shown in FIG. 12*a*. Air is constantly forced through the pulp slurry and the air bubbles attach to the hydrophobic mineral particles, which are conducted to the surface, where they form a froth and are skimmed off. For example, see the flotation cell in FIG. 12*b*. The ground ore is generally subjected to processing in 'rougher' and 'cleaner-scavenger' cells to remove excess gangue and to remove other sulfide minerals. In flotation the kinetics that drive the transport of the froth layer are an important aspect of the efficiency of the separation process and overall mineral recovery. In general, the froth is allowed to build up, collecting minerals of interest. The froth then flows over the process cell discharge lip or weir to be collected as concentrate. This process generally relies on froth mobility, and the natural hydrodynamics of the cell. The notion of froth residence time is important: With the right residence time, the froth layer persists long enough to become 'loaded' with mineral particles then flow over the lip of the cell by gravity. If the froth is insufficiently stable, or the residence time is too long, the bubbles can break and drop the hydrophobic mineral particles back into the slurry, reducing the effectiveness of the process. The distribution in froth residence time can be an important overall factor in optimizing recovery. While flotation cell designs aim to optimize this process, the hydrodynamics of the cell can produce regions where the froth residence time is too long and, the minerals become recycled back into the cell, reducing overall recovery efficiencies.

Bitumen Separation

Froth flotation is also widely used for separating bitumen from oil sands: In this process, mined oil sands ore is crushed and mixed with hot water and chemicals to produce a slurry which is pumped to a extraction/processing plant. The agitation in this "hydrotransport" process breaks down the sand, clay and bitumen in the oil sands. Small air bubbles trapped inside oil sand ore around clay and bitumen are released and the process creates a bitumen-laden froth. As illustrated in FIG. 13, at the processing/extraction plant, the slurry flow is pumped into a primary separation vessel (PSV) where the sand, water and bitumen froth separate due to gravity. This allows the sand at the bottom and the water in the middle of the PSV to get pumped to a tailings pond, and the bitumen froth on top to pass on to further refinement processes. As the gravitational separation requires a long period to fully separate bitumen from water, a layer of emulsified water/bitumen-froth exists, as illustrated in FIG. 14. As the throughput of the PSV is a key bottleneck in oil sands processing, the 'residence' time of the fluids in the PSV is short, so the gravity separation is incomplete: this results in residual bitumen in the tailings. As a result, further extractive processing maybe required before it is deposited in the tailing pond. Even following additional processing of the tailings, to recover residual bitumen, bitumen levels in the few percent can still be present in tailings deposits. Various approaches to recovering this have been developed, including mechanical skimmers which remove froth off the top of a tailing line flow.

Need in Industry

There is a need in the industry to provide a better way to separable valuable material (e.g., ore minerals, bitumen) from unwanted material (e.g., gangue, sands), including in such a flotation cell, for example, so as to eliminate problems associated with using air bubbles in such a separation process.

SUMMARY OF THE INVENTION

The present invention provides new techniques related to magnetically controllable and/or steerable froth for use in separation processes of mineral-bearing ore and bitumen.

According to some embodiments, and by way of example, the present invention may take the form of apparatus featuring a processor configured to contain a fluidic medium having a material-of-interest and also having a surfactant with magnetic properties so as to cause the formation of a froth layer that contains at least some of the material-of-interest and is magnetically responsive; and a magnetic field generator configured to generate a magnetic field and provide non-mechanical mixing and steering/driving of the froth layer in the processor.

According to some embodiments, the apparatus may include one or more of the following features:

The material-of-interest may take the form of, e.g., the mineral-bearing ore particles or bitumen.

The processor may take the form of, e.g., a flotation tank, a primary separation vessel (PSV), as well as a pipe, including a tailings pipeline.

The pipe may include a non-magnetic pipe section, and the magnetic field generator may include a magnetic coil arranged in relation to non-magnetic pipe section to generate the magnetic field and provide the non-mechanical mixing and steering/driving of the froth layer in the pipe. The pipe may include a diverter/skimmer configured to provide a bitumen froth from the pipe The magnetic field generator may include a magnetic coil.

In effect, the new and unique approach allows control of the froth layer to provide non-mechanical mixing and steering/driving of the froth layer, which also allows the froth transport to be directly controlled and modulated.

The approach may be based at least partly on the use of a new class of surfactant that has magnetic properties to allow the production of a froth that is magnetically responsive. By way of example, see 'Magnetic Control over Liquid Surface Properties with Responsive Surfactants', Paul Brown et al., Angew. Chem. Int. Ed. 2012, 51. Steering of the froth can then be controlled via magnetic induction coils above the froth layer, or embedded in the walls of the flotation tank. These magnetic field generators can be used to stir the froth at an acceptably low rate (so that the natural kinetics of the froth are not disturbed), sweep 'pockets' of froth from locations where it would otherwise experience long residence times etc., and effectively ensure that the froth transport and residence time is more uniform for the whole cell.

By way of example, a magnetic field generator may be used configured with two coils driven by controllable currents. Alternatively, other configurations would be feasible providing multiple control/steerage of the froth transport.

The Method

According to some embodiments, the present invention may take the form of a method featuring steps for receiving in a processor an aqueous mixture and an attachable medium, the aqueous mixture comprising valuable material and unwanted material, at least part of the attachable medium and part of the aqueous mixture forming a magnetically responsive medium; causing the attachable medium to contact with the valuable material in the aqueous mixture so as to allow the valuable material to attach to the attachable medium; and stirring the magnetically responsive medium with a magnetic field.

According to some embodiments of the present invention, the attachable medium comprises air bubbles and at least some of the air bubbles comprise valuable material attached thereto to form enriched air bubbles, wherein the aqueous mixture comprises a magnetically responsive surfactant, and the magnetically responsive medium comprises at least some of the enriched air bubbles and part of the magnetically responsive surfactant, said method further comprising the step of transporting the enriched air bubbles out of the processor.

According to some embodiments of the present invention, the attachable medium comprises air bubbles and at least some of air bubbles comprise valuable material attached thereto to form enriched air bubbles, wherein the aqueous mixture comprises magnetic particles dispersed therein, and the magnetically responsive medium comprises at least some of the enriched air bubbles and at least some of magnetic particles in the aqueous mixture, said method further comprising the step of transporting the enriched air bubbles out of the processor.

According to some embodiments of the present invention, the attachable medium comprises synthetic bubbles and at least some of synthetic bubbles comprise valuable material attached thereto to form enriched synthetic bubbles, wherein the aqueous mixture comprises a magnetically responsive surfactant, and the magnetically responsive medium comprises at least some of the enriched synthetic bubbles and part of the magnetically responsive surfactant, said method further comprising the step of transporting the enriched synthetic bubbles out of the processor.

According to some embodiments of the present invention, the attachable medium comprises synthetic bubbles and at least some of synthetic bubbles comprising valuable material attached thereto to form enriched synthetic bubbles, wherein the aqueous mixture comprises magnetic particles dispersed therein, and the magnetically responsive medium comprises at least some of the enriched synthetic bubbles and at least some of the magnetic particles in the aqueous mixture, said method further comprising the step of transporting the enriched synthetic bubbles out of the processor.

Apparatus

According to some embodiments, the present invention may take the form of an apparatus featuring a processor and a magnetic field generator configured to generate a magnetic field, the processor configured to receive an aqueous mixture and an attachable medium, the aqueous mixture comprising valuable material and unwanted material; to cause the attachable medium to contact with the valuable material in the aqueous mixture so as to allow the valuable material to attach to the attachable medium; and to form a magnetically responsive medium comprising at least part of the attachable medium and the aqueous mixture, the magnetically responsive medium arranged to interact with the magnetic field for mixing.

According to some embodiments of the present invention, at least part of the attachable medium comprises valuable material attached thereto to form an enriched attachable medium, wherein the aqueous mixture comprises a magnetically responsive surfactant, and the magnetically responsive medium comprises the enriched attachable medium and the magnetically responsive surfactant in a froth formed in the processor, and the magnetic field is arranged to stir the froth for said mixing.

According to some embodiments, the attachable medium comprises air bubbles and at least some of the air bubbles comprise valuable material attached thereto to form enriched air bubbles, wherein the aqueous mixture comprises a magnetically responsive surfactant, and the magnetic responsive medium comprises at least some of the enriched air bubbles and at least part of the magnetically responsive surfactant, said processor further configured to transport the enriched air bubbles away from the aqueous mixture.

According to some embodiments of the present invention, the attachable medium comprises air, and the processor may be further configured to mix the air with the aqueous mixture so as to form air bubbles in the aqueous mixture, wherein at least some of the air bubbles comprise valuable material attached thereto to form enriched air bubbles, and the magnetic responsive medium comprises at least some of the enriched air bubbles and the magnetically responsive surfactant and/or magnetic particles in the aqueous mixture, said processor further configured to transport the enriched air bubbles away from the aqueous mixture.

According to some embodiments of the present invention, the attachable medium comprises synthetic bubbles and at least some of synthetic bubbles comprise valuable material attached thereto to form enriched synthetic bubbles, wherein the aqueous mixture comprises a magnetically responsive surfactant, and the magnetically responsive medium comprises at least some of the enriched synthetic bubbles and part of the magnetically responsive surfactant in the aqueous mixture, said processor further configured to transport the enriched synthetic bubbles away from the aqueous mixture.

According to some embodiments of the present invention, the attachable medium comprises synthetic bubbles and at least some of synthetic bubbles comprise valuable material attached thereto to form enriched synthetic bubbles, wherein the aqueous mixture comprises magnetic particles dispersed therein, and the magnetically responsive medium comprises at least some of the enriched synthetic bubbles and part of the aqueous mixture, said processor further configured to transport the enriched synthetic bubbles away from the aqueous mixture.

According to some embodiments of the present invention, the attached medium comprises synthetic bubbles and at least some of synthetic bubbles comprise valuable material attached thereto to form enriched bubbles, wherein the synthetic bubbles comprise a magnetic material responsive to the magnetic field, said processor further configured to transport the enriched synthetic bubbles away from the aqueous mixture.

According to some embodiments of the present invention, the magnetic field generator comprises one or more magnetic induction coils, or electrically conductive coils arranged to conduct electric current for generating the magnetic field.

According to some embodiments, the present invention may take the form of a cell or column configured to receive an aqueous mixture and an attachable medium, the aqueous mixture comprising valuable material and unwanted material, and to cause the attachable medium to contact with the valuable material in the aqueous mixture so as to allow the valuable material to attach to the attachable medium, wherein at least part of the attachable medium and part of the aqueous mixture form a magnetically responsive medium arranged to interact with a magnetic field for mixing.

According to some embodiments of the present invention, the attachable medium comprises air bubbles and at least some of the air bubbles comprises valuable material attached thereto to form enriched air bubbles, wherein the aqueous mixture comprises a magnetically responsive surfactant, and the magnetic responsive medium comprises at least some of the enriched air bubbles and at least part of the magnetically responsive surfactant, and the cell or column may be further configured to transport the enriched air bubbles away from the aqueous mixture.

According to some embodiments of the present invention, the attachable medium comprises air, and the cell or column may be further configured to mix the air with the aqueous mixture so as to form air bubbles in the aqueous mixture, at least some of the air bubbles comprising valuable material attached thereto to form enriched air bubbles, wherein the magnetic responsive medium comprises at least some of the enriched air bubbles, and a magnetically-responsive surfactant in the aqueous mixture, and the cell or column may be further configured to transport the enriched air bubbles away from the aqueous mixture.

According to some embodiments of the present invention, the attachable medium comprises air bubbles and at least some of air bubbles comprise valuable material attached thereto to form enriched air bubbles, wherein the aqueous mixture comprises magnetic particles dispersed therein, and the magnetically responsive medium comprises at least some of the enriched air bubbles and at least some of the magnetic particles in the aqueous mixture, and the cell or column may be further configured to transport the enriched air bubbles away from the aqueous mixture.

According to some embodiments of the present invention, the attachable medium comprises synthetic bubbles and at least some of synthetic bubbles comprise valuable material attached thereto to form enriched synthetic bubbles, wherein the aqueous mixture comprises a magnetically responsive surfactant, and the magnetically responsive medium comprises at least some of the enriched synthetic bubbles and part of the magnetically responsive surfactant, and the cell or column may be further configured to transport the enriched synthetic bubbles away from the aqueous mixture.

According to some embodiments of the present invention, the attachable medium comprises synthetic bubbles and at least some of synthetic bubbles comprise valuable material attached thereto to form enriched synthetic bubbles, wherein the aqueous mixture comprises magnetic particles dispersed therein, and the magnetically responsive medium comprises at least some of the enriched synthetic bubbles and part of the aqueous mixture, the cell or column may be further configured to transport the enriched synthetic bubbles away from the aqueous mixture.

According to some embodiments of the present invention, the attached medium comprises synthetic bubbles and at least some of synthetic bubbles comprise valuable material attached thereto to form enriched bubbles, wherein the synthetic bubbles comprise a magnetic material responsive to the magnetic field, said cell or column further configured to transport the enriched synthetic bubbles away from the aqueous mixture.

In effect, the present invention provides mineral separation techniques using synthetic beads or bubbles, including size-, weight-, density- and magnetic-based polymer bubbles or beads. The term "polymer" in the specification means a large molecule made of many units of the same or similar structure linked together.

The present invention may consist of replacing or assisting the air bubbles in a flotation cell that are presently used in the prior art with a similar density material that has very controllable size characteristics. By controlling the size and the injection rate a very accurate surface area flux can be achieved. This type of control would enable the bead or bubble size to be tuned or selected to the particle size of interest in order to better separate valuable or desired material from unwanted material in the mixture. Additionally, the buoyancy of the bubble or bead may be selected to provide a desired rate of rise within a flotation cell to optimize attraction and attachment to mineral particles of interest. By way of example, the material or medium could be a polymer or polymer-based bubble or bead. These polymer or polymer-based bubbles or beads are very inexpensive to manufacture and have a very low density. They behave very similar to a bubble, but do not pop.

Since this lifting medium size is not dependent on the chemicals in the flotation cell, the chemicals may be tailored to optimize hydrophobicity. There is no need to compromise the performance of the frother in order to generate the desired bubble size. A controlled size distribution of medium may be customized to maximize recovery of different feed matrixes to flotation as ore quality changes.

There may be a mixture of both air and lightweight beads or bubbles. The lightweight beads or bubbles may be used to lift the valuable material and the air may be used to create the desired froth layer in order to achieve the desired material grade.

Bead or bubble chemistry is also developed to maximize the attachment forces of the lightweight beads or bubbles and the valuable material.

A bead recovery process is also developed to enable the reuse of the lightweight beads or bubbles in a closed loop process. This process may consist of a washing station whereby the valuable mineral is mechanically, chemically, thermally or electromagnetically removed from the lightweight beads or bubbles. In particular, the removal process may be carried out by way of controlling the pH value of the medium in which the enriched polymer beads or bubbles are embedded, controlling the temperature of the medium, applying mechanical or sonic agitation to the medium, illuminating the enriched polymer beads with light of a certain range of frequencies, or applying electromagnetic waves on the enriched polymer beads in order to weaken or interrupting the bonds between the valuable material and the surface of the polymer beads or bubbles.

The Separation Process or Processor

According to some embodiments of the present invention, and by way of example, the separation process may utilize existing mining industry equipment, including traditional column cells and thickeners. The lightweight synthetic beads or bubbles, including polymer bubbles, may be injected into a first traditional column or cell at an injection air port and rise to the surface. This first traditional column or cell has an environment that is conducive to particle attachment. As the lightweight synthetic beads or bubbles rise they collide with the falling mineral particles. The falling mineral particles stick to the lightweight synthetic beads or bubbles and float or report to the surface. The wash water can be used to clean off the entrained gangue. The recovered bubbles and mineral may be sent to another traditional column or cell and injected into, e.g., the middle of the column. This traditional column or cell has an environment that will promote release of the mineral particles. The mineral particles fall to the bottom and the synthetic bubbles or beads float or go to the surface. The synthetic bubbles or beads may be reclaimed and then sent back through the process taking place in the first traditional column or cell. Thickeners may be used to reclaim the process water at both stages of the process.

Flotation Recovery of Coarse Ore Particles in Mining

According to some embodiments, the present invention may be used for flotation recovery of coarse ore particles in mining.

For example, the concept may take the form of the creation of the lightweight synthetic beads or bubbles in a flotation recovery for lifting particles, e.g., greater than 150 micron, to the surface in a flotation cell or column.

The fundamental notion is to create a shell or "semi-porous" structured bead or bubble of a predetermined size and use this as an 'engineered 'air bubble' for improving flotation recovery, e.g., of coarse ore particles in mining.

Flotation recovery may be implemented in multiple stages, e.g., where the first stage works well at recovering the ground ore at the right size (<150 microns), but ore particles that are too small or to large pass on to later stages and are more difficult to recover.

The present invention includes creating the "bubbles," and engineering them to carry the ore to the surface using, e.g., a polymer shell or structure, appropriately chemically activated to attract or attach to the ore.

Depending on the method of "engineering" the bubble, at or near the surface the shell could dissolve (time activated), and release an agent that further promotes the frothing.

Polymer Blocks Having Incorporated Air or Light-Weight Material

According to some embodiments, the present invention may take the form of synthetic flotation bubbles, using a concept such as incorporating air bubbles into polymer blocks, which are designed to attract or attach mineral rich ore onto their surface and then float to the top of the flotation tank. It is also possible to incorporate light-weight material such as Styrofoam into the polymer blocks to aid buoyancy.

The benefits of this approach include the fact that “engineered bubbles” in a polymer may enable a much larger range of ore grains to be lifted to the surface hence improving recover efficiency.

According to some embodiments, optimally sized polymer blocks with a high percentage of air may be produced with appropriate collector chemicals also encapsulated into the polymer.

Once the blocks are in, e.g., a mixture such as a slurry pulp, the collector chemicals may be released to initially attract or attach to mineral rich ore particles and then rise to the surface.

Synthetic Beads or Bubbles

According to some embodiments of the present invention, the synthetic bubbles or beads may be made from a polymer or polymer-based material, or silica or silica-based material, or glass or glass-based material.

According to some embodiments of the present invention, the synthetic bubbles or beads may be configured with firm outer shells functionalized with a chemical to attach to the valuable material in the mixture. Alternatively, the synthetic bubbles or beads may include a chemical that may be released to attach to the valuable material in the mixture.

According to some embodiments of the present invention, the synthetic bubbles or beads may be constructed with firm outer shells configured to contain a gas, including air, so as to increase be buoyant when submerged in the mixture. Alternatively, the synthetic bubbles or beads may be made from a low-density material so as to be buoyant when submerged in the mixture, including the synthetic bubbles being configured as a solid without an internal cavity.

According to some embodiments of the present invention, the synthetic bubbles or beads may include a multiplicity of hollow objects, bodies, elements or structures, each configured with a respective cavity, unfilled space, or hole to trap and maintain a bubble inside. The hollow objects, bodies, elements or structures may include hollow cylinders, or spheres, or globules, or capillary tubes, or some combination thereof. Each hollow object, body, element or structure may be configured with a dimension so as not to absorb liquid, including water, including where the dimension is in a range of about 20-30 microns. The multiplicity of hollow objects, bodies, elements or structures may be configured with chemicals applied to prevent migration of liquid into respective cavities, including where the chemicals are hydrophobic chemicals. The synthetic bubbles or beads made from the silica or silica-based material, or glass or glass-based material, may take the form of hollow glass cylinders manufactured using a drawing and dicing process.

The scope of the invention is not intended to be limited to the size or shape of the synthetic beads or bubbles, so as to enhance their rise or fall in the mixture.

The scope of the invention is also intended to include other types or kinds of ways to construct and functionalize the synthetic bubbles or beads either now known or later developed in the future in order to perform the aforementioned functionality of being buoyant when submerged in the mixture and to attach to the valuable material in the mixture.

According to some embodiments of the present invention, the mixture may take the form of a slurry pulp containing, e.g., water and the valuable material of interest.

Magnetic Stirring of Froth and/or Pulp Slurry

According to various embodiments of the present invention, a magnetic field may be used to stir the froth in order to control and modulate the froth transport so as to minimize or eliminate the regions in flotation cell where the froth residence time is too long, allowing the minerals to recycle back into the cell. The magnetic field can also be used to stir the pulp slurry so as to increase the contact between the synthetic beads or bubbles with the valuable material. Thus, a magnetic responsive surfactant, or magnetic colloidal particles may be added to the pulp slurry so that the froth or the pulp slurry becomes a magnetic responsive medium for magnetic mixing. Alternatively, magnetic synthetic beads or bubbles are used in the flotation cell. The magnetic synthetic beads or bubbles and the pulp slurry form a magnetic responsive medium for magnetic mixing.

A Method for Implementing in a Flotation Separation Device

The present invention may also take the form of a method, e.g., for implementing in a flotation separation device having a flotation cell or column. The method may include steps for receiving in the flotation cell or column a mixture of fluid and valuable material; receiving in the flotation cell or column synthetic bubbles or beads constructed to be buoyant when submerged in the mixture and functionalized to attach to the valuable material in the mixture and; and providing from the flotation cell or column enriched synthetic bubbles or beads having the valuable material attached thereto.

According to some embodiments of the present invention, the method may include being implemented consistent with one or more of the features set forth herein.

Apparatus in the Form of a Flotation Separation Device

According to some embodiments, the present invention may take the form of apparatus such as a flotation separation device, including a flotation cell or column configured to receive a mixture of water, valuable material and unwanted material; receive polymer or polymer-based materials, including polymer or polymer bubbles or beads, configured to attach to the valuable material in the mixture; and provide enriched polymer or polymer-based materials, including enriched polymer or polymer-based bubbles or beads, having the valuable material attached thereon. According to some embodiments, the polymer or polymer-based material may be configured with a surface area flux by controlling some combination of the size of the polymer or polymer-based material and/or the injection rate that the mixture is received in the flotation cell or column; or the polymer or polymer-based material may be configured with a low density so as to behave like air bubbles; or the polymer or polymer-based material may be configured with a controlled size distribution of medium that may be customized to maximize recovery of different feed matrixes to flotation as valuable material quality changes, including as ore quality changes; or some combination thereof.

The present invention may take the form of apparatus for use in, or forming part of, a separation process to be implemented in separation processor technology, the apparatus featuring synthetic bubbles or beads configured with a polymer or polymer-based material functionalized to attach to a valuable material in a mixture so as to form an enriched synthetic bubbles or beads having the valuable material attached thereto, and also configured to be separated from the mixture based at least partly on a difference in a physical property between the enriched synthetic bubbles or beads having the valuable material attached thereto and the mixture.

The separation process may be implemented in separation processor technology which combines the synthetic bubbles or beads and the mixture, and which provides the enriched synthetic bubbles or beads having the valuable material attached thereto that are separated from the mixture based at least partly on the difference in the physical property between the enriched synthetic bubbles or beads having the valuable material attached thereto and the mixture.

Size-Based Separation

The separation process may be implemented using sized-based separation, where the synthetic bubbles or beads may be configured to be separated from the mixture based at least partly on the difference between the size of the enriched synthetic bubbles or beads having the valuable material attached thereto in relation to the size of unwanted material in the mixture.

According to some embodiments of the present invention, the synthetic bubbles or beads may be configured either so that the size of the synthetic bubbles or beads is greater than a maximum ground ore particle size in the mixture, or so that the size of the synthetic bubbles or beads is less than a minimum ground ore particle size in the mixture.

According to some embodiments of the present invention, the synthetic bubbles or beads may be configured as solid polymer bubbles or beads.

According to some embodiments of the present invention, the synthetic bubbles or beads may be configured with a core material of sand, silica or other suitable material and also configured with a polymer encapsulation.

Weight-Based Separation

The separation process may be implemented using weight-based separation, where the synthetic bubbles or beads are configured to be separated from the mixture based at least partly on the difference between the weight of the enriched synthetic bubbles or beads having the valuable material attached thereto in relation to the weight of unwanted material in the mixture.

According to some embodiments of the present invention, the synthetic bubbles or beads may be configured so that the weight of the synthetic bubbles or beads is greater than a maximum ground ore particle weight in the mixture, or so that the weight of the synthetic bubbles or beads is less than a minimum ground ore particle weight in the mixture.

According to some embodiments of the present invention, the synthetic bubbles or beads may be configured as solid polymer bubbles or beads.

According to some embodiments of the present invention, the synthetic bubbles or beads may be configured with a core material of magnetite, air or other suitable material and also configured with a polymer encapsulation.

Magnetic-Based Separation

The separation process may be implemented using magnetic-based separation, where the synthetic bubbles or beads may be configured to be separated from the mixture based at least partly on the difference between the para-, ferri-, ferro-magnetism of the enriched synthetic bubbles or beads having the valuable material attached thereto in relation to the para-, ferri, ferro-magnetism of unwanted material in the mixture.

According to some embodiments of the present invention, the synthetic bubbles or beads may be configured so that the para-, ferri-, ferro-magnetism of the synthetic bubbles or beads is greater than the para-, ferri-, ferro-magnetism of the unwanted ground ore particle in the mixture.

According to some embodiments of the present invention, the synthetic bubbles or beads may be configured with a ferro-magnetic or ferri-magnetic core that attract to para-magnetic surfaces and also configured with a polymer encapsulation.

Density-Based Separation

The separation process may be implemented using density-based separation, where the synthetic bubbles or beads may be configured to be separated from the mixture based at least partly on the difference between the density of the enriched synthetic bubbles or beads having the valuable material attached thereto and the density of the mixture, consistent with that disclosed in patent application serial no. PCT/US12/38528 (WFVA/CiDRA file no. 712-002.356-1/CCS-0052), filed 25 May 2012, which is hereby incorporated by reference in its entirety.

Residual Bitumen Recovery Using Magnetically Controllable Froth

A new approach to residual bitumen recovery is also provided herein that utilizes magnetic surfactants. Consistent with that set forth above, this approach relies on the use of the new class of surfactant that has magnetic properties to allow the production of a froth that is magnetically responsive (See the aforementioned Brown et al. reference.) In this approach, a magnetic surfactant may be added to the process to produce a froth layer with magnetic properties. This allows multiple potential benefits to the extraction process:

The gravitational separation in the primary separation vessel (PSV) can be magnetically assisted/enhanced. This should produce more rapid separation dynamics as compared to gravity alone as the froth can be "magnetically pulled" up out of the water layer. This can lead to better separation, and reducing the "residence" time in the PSV, thus increasing throughput.

Residual bitumen in the tailing stream could be magnetically steered, or lifted from the process to enhance other mechanical skimmers/diverters etc.

BRIEF DESCRIPTION OF THE DRAWING

Referring now to the drawing, which are not necessarily drawn to scale, the foregoing and other features and advantages of the present invention will be more fully understood from the following detailed description of illustrative embodiments, taken in conjunction with the accompanying drawing in which like elements are numbered alike:

FIG. 2*a* is a diagram of a flotation cell or column that may be used in place of the flotation cell or column that forms part of the flotation system, process or apparatus shown in FIG. 1*a* according to some embodiments of the present invention.

FIG. 2*b* is a diagram of a flotation cell or column that may be used in place of the flotation cell or column that forms part of the flotation system, process or apparatus shown in FIGS. 1*b* and 1*c* according to some embodiments of the present invention.

FIG. 7 is a diagram of an apparatus using counter-current flow for mineral separation, according to some embodiments of the present invention.

FIG. 12*a* is a diagram of a typical flotation circuit that is known in the art.

FIG. 12*b* is a diagram showing dynamics of a typical flotation cell that is known in the art.

DETAILED DESCRIPTION OF THE INVENTION

FIGS. 1*a*-1*f*

Figure 1A:
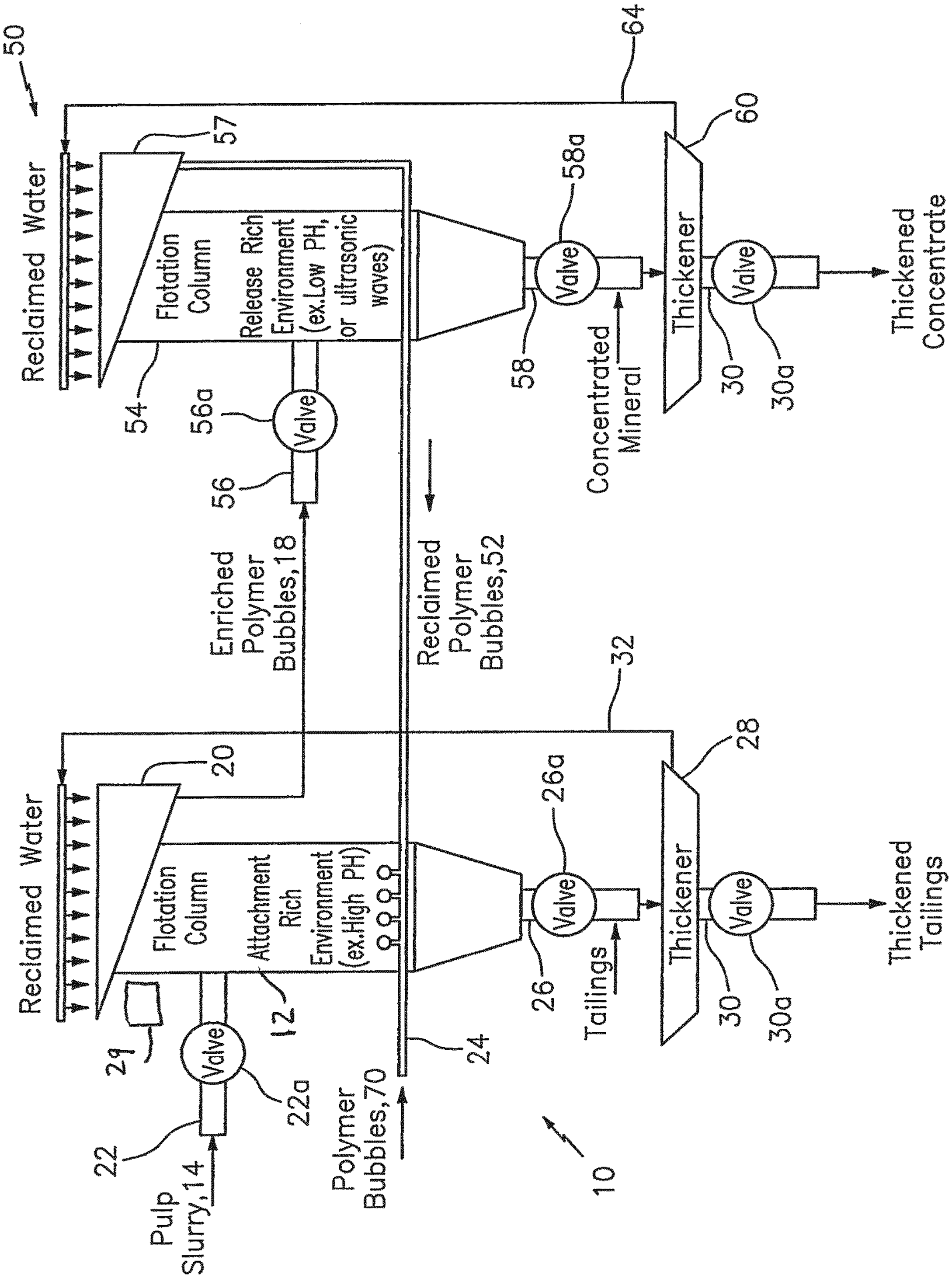
FIG. 1*a* is a diagram of a flotation system, process or apparatus according to some embodiments of the present invention, wherein polymer beads or bubbles are used in a flotation column to attract valuable material.

By way of example, FIG. 1*a* shows the present invention is the form of apparatus 10, having a flotation cell or column 12 configured to receive a mixture of fluid (e.g. water), valuable material and unwanted material, e.g., a pulp slurry 14; receive synthetic bubbles or beads 70 (FIG. 3*a* to FIG. 5*d*) that are constructed to be buoyant when submerged in the pulp slurry or mixture 14 and functionalized to control the chemistry of a process being performed in the flotation cell or column, including to attach to the valuable material in the pulp slurry or mixture 14; and provide enriched synthetic bubbles or beads 18 having the valuable material attached thereon. The terms "synthetic bubbles or beads" and "polymer bubbles or beads" are used interchangeably in this disclosure. The terms "valuable material", "valuable mineral" and "mineral particle" are also used interchangeably. By way of example, the synthetic bubbles or beads 70 may be made from polymer or polymer-based materials, or silica or silica-based materials, or glass or glass-based materials, although the scope of the invention is intended to include other types or kinds of material either now known or later developed in the future. For the purpose of describing one example of the present invention, in FIG. 1*a* the synthetic bubbles or beads 70 and the enriched synthetic bubble or beads 18 are shown as enriched polymer or polymer-based bubbles labeled 18. The flotation cell or column 12 is configured with a top portion or piping 20 to provide the enriched polymer or polymer-based bubbles 18 from the flotation cell or column 12 for further processing consistent with that set forth herein. The enriched polymer bubbles 18 are mostly in a froth layer near the top portion 20. The froth layer contains a magnetically-responsive medium. In order to directly control and modulate the froth transport, a magnetic steering mechanism 29 is provided near the top portion 20 for steering the froth. According to one embodiment of the present invention, the magnetically-responsive medium comprises a magnetically responsive surfactant (see FIG. 1*d*, for example).

Figure 1B:
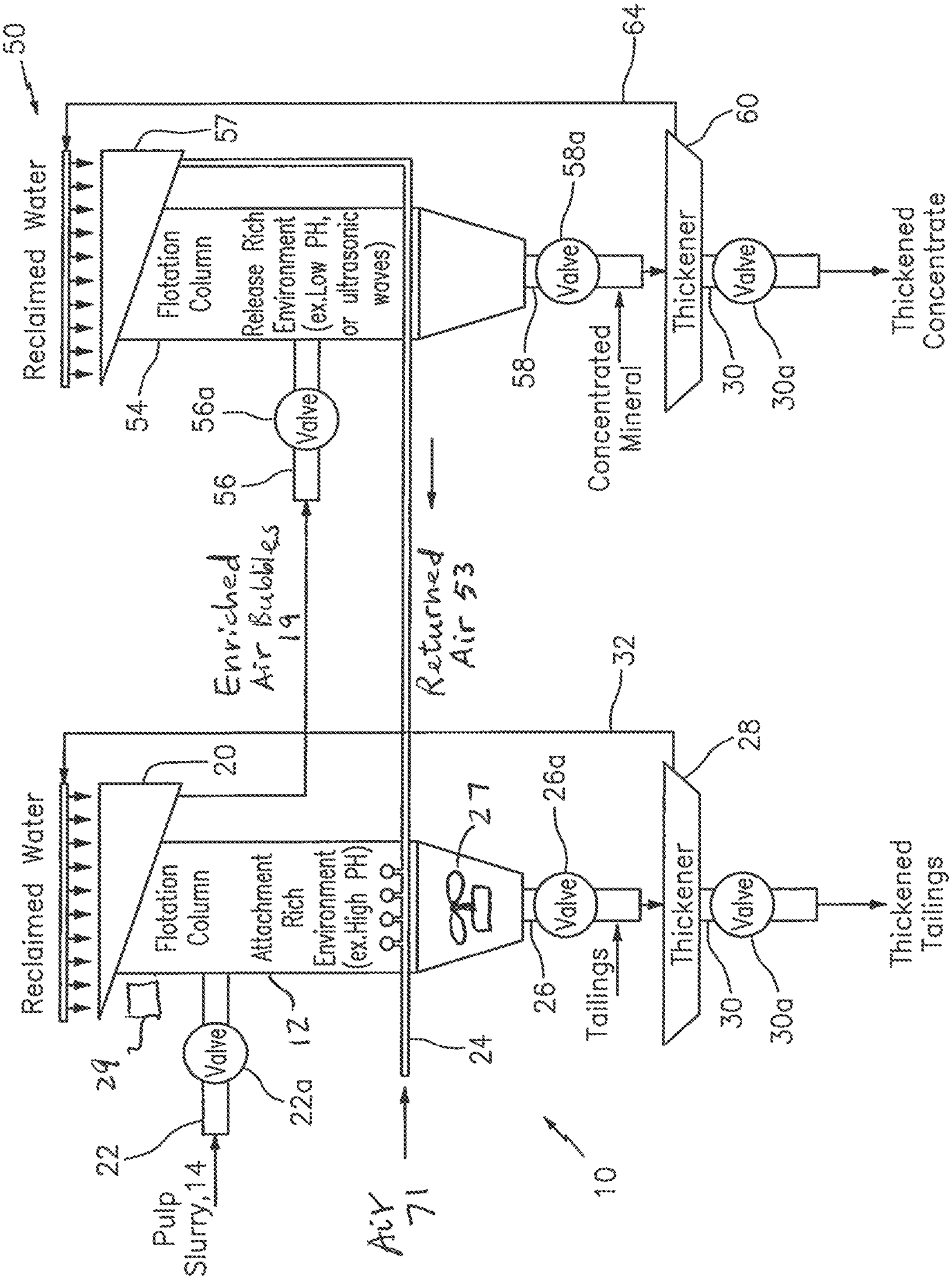
FIG. 1*b* is a diagram of a flotation system, process or apparatus according to some embodiments of the present invention, wherein air bubbles are used in a flotation column to attract valuable material.
Figure 1C:
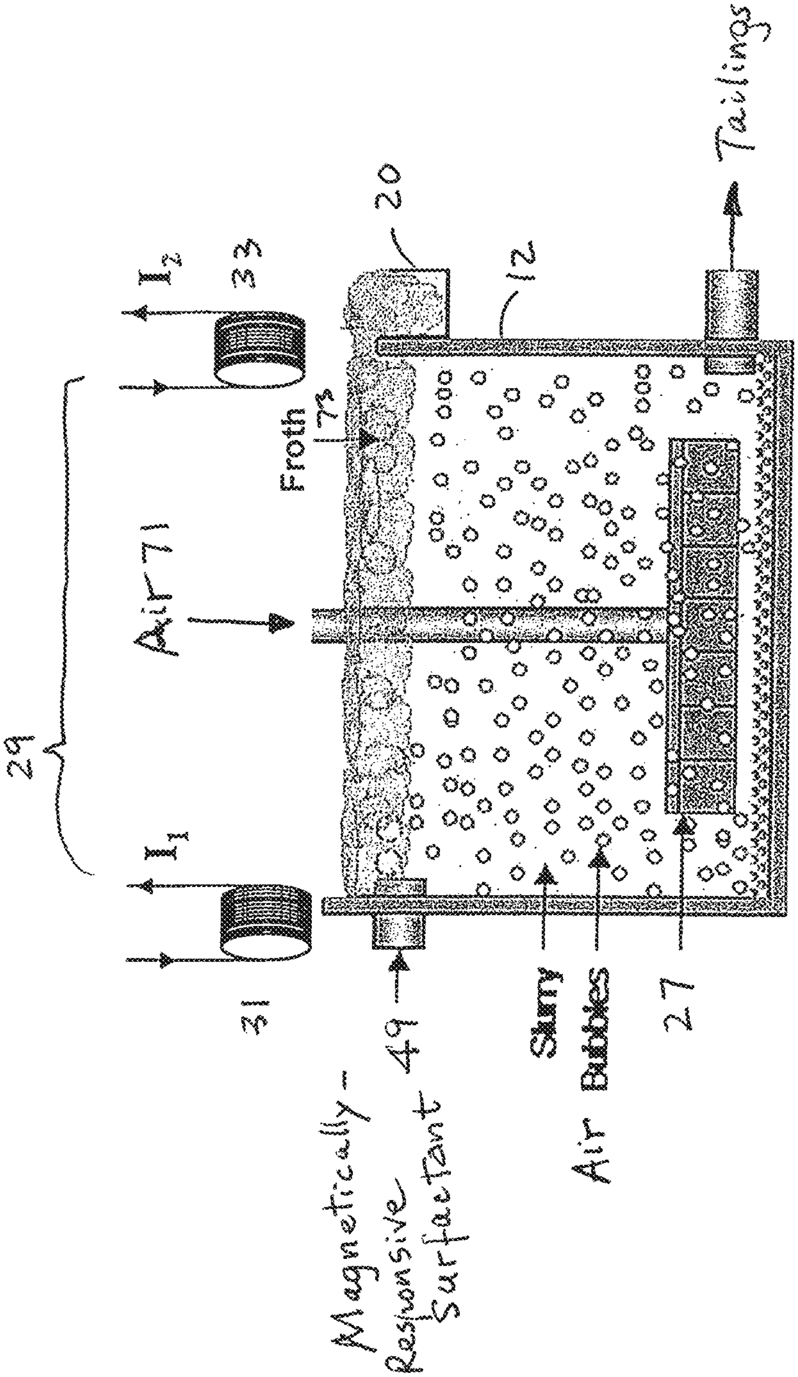
FIG. 1*c* is a diagram of a flotation system, showing a magnetic steering mechanism for use in mixing, steering and driving a froth layer, according to one embodiment of the present invention.
Figure 1D:
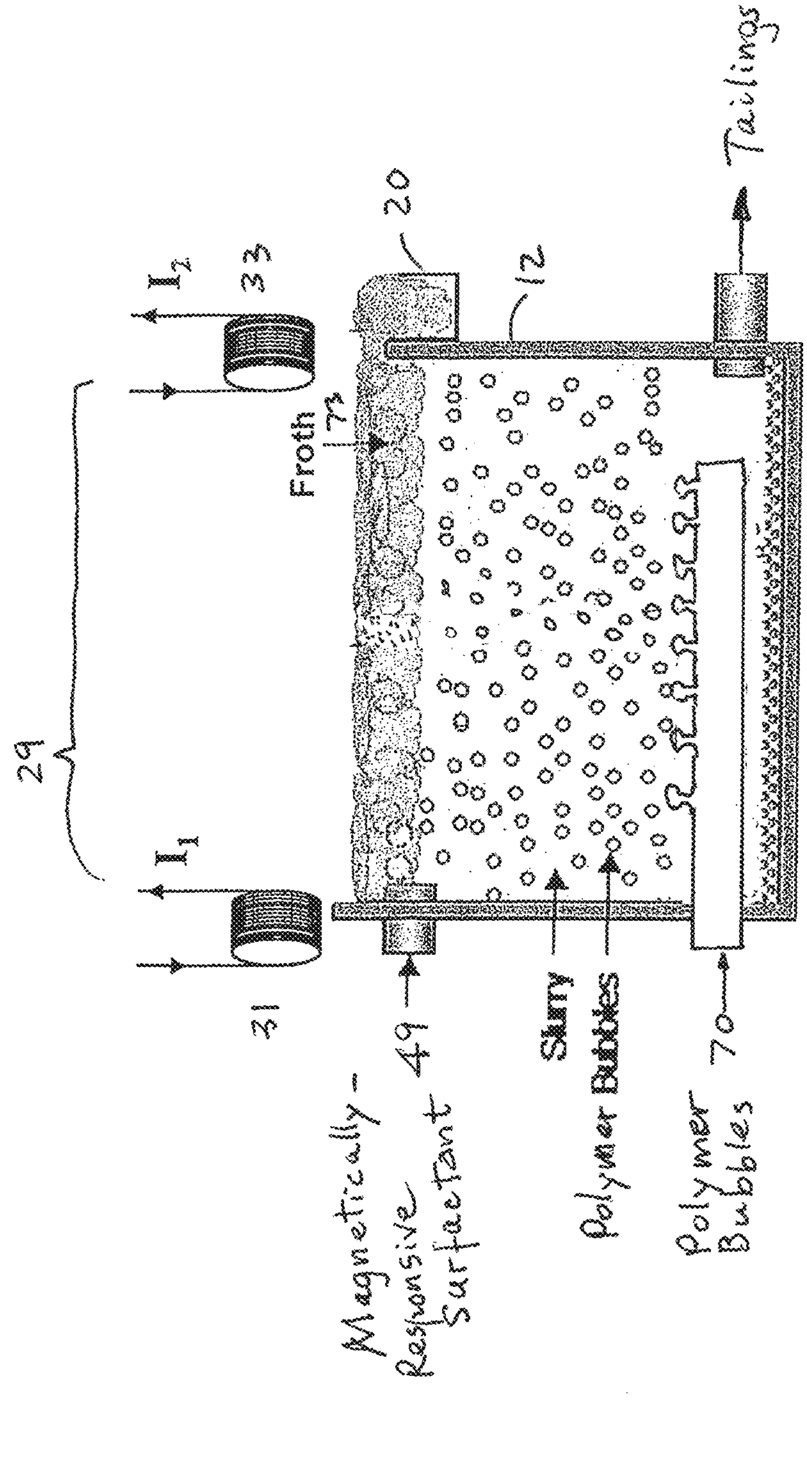
FIG. 1*d* is a diagram of a flotation system, showing a magnetic steering mechanism for use in mixing, steering and driving a froth layer, according to another embodiment of the present invention.
Figure 1E:
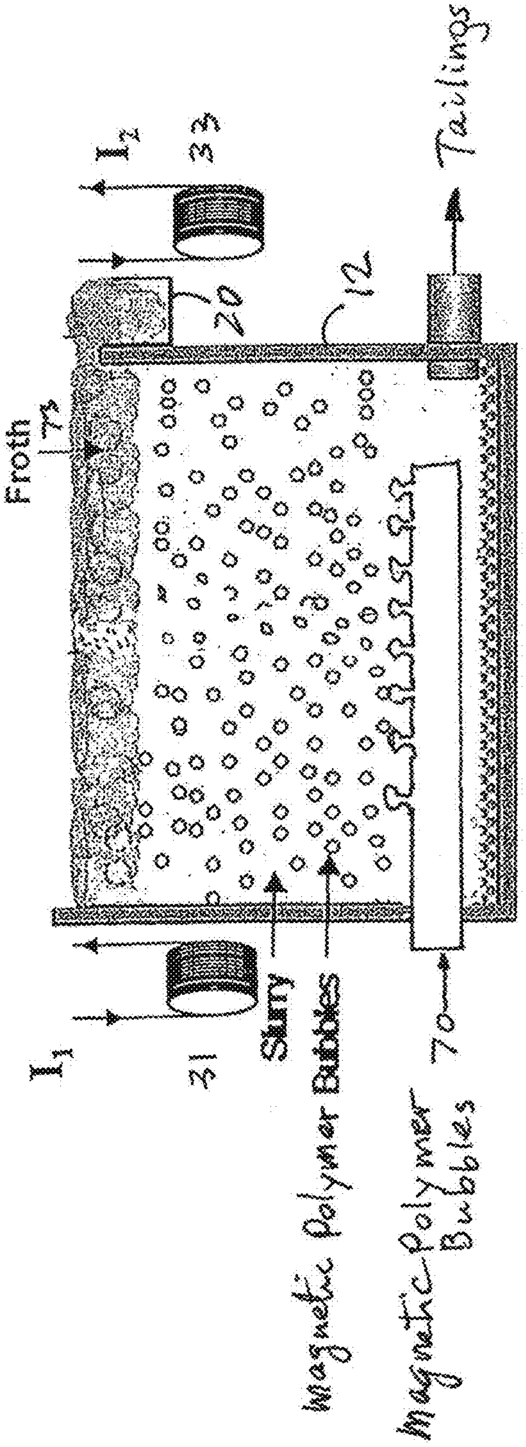
FIG. 1*e* is a diagram of a flotation system, showing a magnetic steering mechanism for use in mixing, steering and driving the mixture in a flotation cell, according to yet another embodiment of the present invention.
Figure 1F:
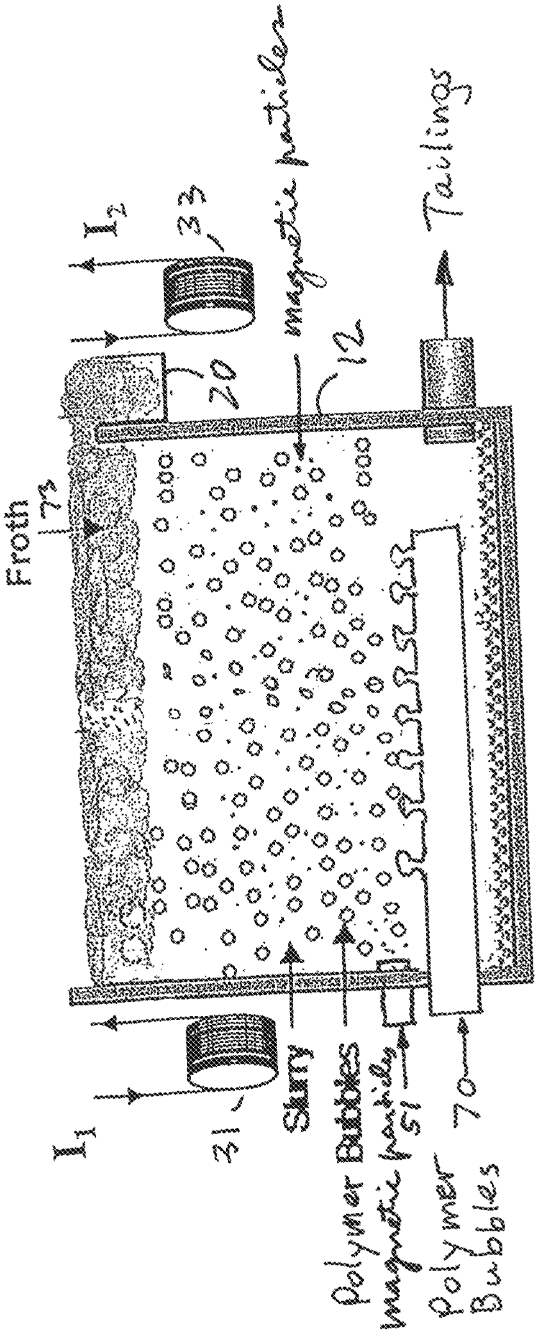
FIG. 1*f* is a diagram of a flotation system, showing a magnetic mechanism for use in mixing, steering and driving the mixture containing magnetic particles dispersed in the mixture, according to some embodiments of the present invention.

According to another embodiment of the present invention, the pulp slurry or mixture 14 contains magnetic particles dispersed therein (see FIG. 1*f*, for example). As such, the magnetic particles, the synthetic bubbles or beads 70, and the mixture 14 form a magnetically responsive medium. In order to increase the contact between the synthetic bubbles or beads 70 and the valuable material in the mixture, a magnetic steering mechanism is provided to stir the magnetically responsive medium (see FIG. 1*f*, for example).

Figure 4A:
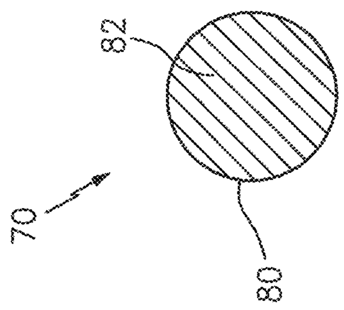
FIG. 4*a* illustrates a synthetic bead having a body made of a synthetic material, according to some embodiments of the present invention.
Figure 4B:
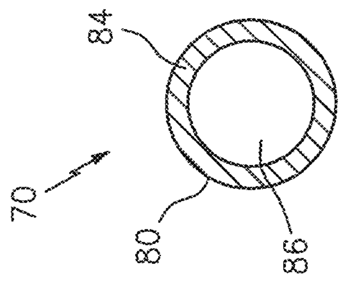
FIG. 4*b* illustrates a synthetic bead with a synthetic shell, according to some embodiments of the present invention.
Figure 4C:
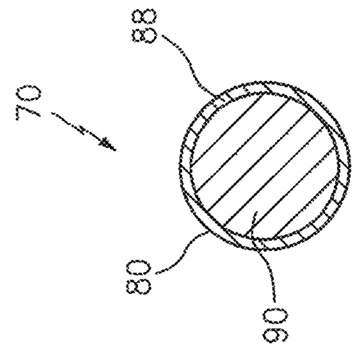
FIG. 4*c* illustrates a synthetic bead with a synthetic coating, according to some embodiments of the present invention.
Figure 4D:
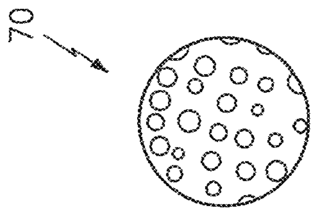
FIG. 4*d* illustrates a synthetic bead taking the form of a porous block, a sponge or a foam, according to some embodiments of the present invention.

According to yet another embodiment of the present invention, the synthetic bubbles or beads 70 are configured with a magnetic material, such as para- ferri-ferro-magnetic core (see FIG. 4*c*, for example). As such, the "magnetic" synthetic bubbles or beads 70 and the mixture 14 form a magnetically responsive medium. In order to increase the contact between the synthetic bubbles or beads 70 and the valuable material in the mixture, a magnetic steering mechanism is provided to stir the magnetically responsive medium (see FIG. 1*e*, for example).

The flotation cell or column 12 may be configured with a top part or piping 22, e.g., having a valve 22*a*, to receive the pulp slurry or mixture 14 and also with a bottom part or piping 24 to receive the synthetic bubbles or beads 70. In operation, the buoyancy of the synthetic bubbles or beads 70 causes them to float upwardly from the bottom to the top of the flotation cell or column 12 through the pulp slurry or mixture 14 in the flotation cell or column 12 so as to collide with the water, valuable material and unwanted material in the pulp slurry or mixture 14. The functionalization of the synthetic bubbles or beads 70 causes them to attach to the valuable material in the pulp slurry or mixture 14. As used herein, the term "functionalization" means that the properties of the material making up the synthetic bubbles or beads 70 are either selected (based upon material selection) or modified during manufacture and fabrication, to be "attracted" to the valuable material, so that a bond is formed between the synthetic bubbles or beads 70 and the valuable material, so that the valuable material is lifted through the cell or column 12 due to the buoyancy of the synthetic bubbles or beads 70. For example, the surface of synthetic bubbles or beads has functional groups for collecting the valuable material. Alternatively, the synthetic bubbles or beads are functionalized to be hydrophobic for attracting wetted mineral particles—those mineral particles having collector molecules attached thereto. As a result of the collision between the synthetic bubbles or beads 70 and the water, valuable material and unwanted material in the pulp slurry or mixture 14, and the attachment of the synthetic bubbles or beads 70 and the valuable material in the pulp slurry or mixture 14, the enriched polymer or polymer-based bubbles 18 having the valuable material attached thereto will float to the top of the flotation cell 12 and form part of the froth formed at the top of the flotation cell 12. The flotation cell 12 may include a top part or piping 20 configured to provide the enriched polymer or polymer-based bubbles 18 having the valuable material attached thereto, which may be further processed consistent with that set forth herein. In effect, the enriched polymer or polymer-based bubbles 18 may be taken off the top of the flotation cell 12 or may be drained off by the top part or piping 20.

The flotation cell or column 12 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the synthetic bubbles or beads 70 may be configured with a surface area flux by controlling some combination of the size of the polymer or polymer-based bubbles and/or the injection rate that the pulp slurry or mixture 14 is received in the flotation cell or column 12. The synthetic bubbles or beads 70 may also be configured with a low density so as to behave like air bubbles. The synthetic bubbles or beads 70 may also be configured with a controlled size distribution of medium that may be customized to maximize recovery of different feed matrixes to flotation as valuable material quality changes, including as ore quality changes.

According to some embodiments of the present invention, the flotation cell or column 12 may be configured to receive the synthetic bubbles or beads 70 together with air, where the air is used to create a desired froth layer in the mixture in the flotation cell or column 12 in order to achieve a desired grade of valuable material. The synthetic bubbles or beads 70 may be configured to lift the valuable material to the surface of the mixture in the flotation cell or column.

The Thickener 28

The apparatus 10 may also include piping 26 having a valve 26*a* for providing tailings to a thickener 28 configured to receive the tailings from the flotation cell or column 12. The thickener 28 includes piping 30 having a valve 30*a* to provide thickened tailings. The thickener 28 also includes suitable piping 32 for providing reclaimed water back to the flotation cell or column 12 for reuse in the process. Thickeners like element 28 are known in the art, and the scope of the invention is not intended to be limited to any particular type or kind either now known or later developed in the future.

The Bead Recovery Process or Processor 50

According to some embodiments of the present invention, the apparatus 10 may further comprises a bead recovery process or processor generally indicated as 50 configured to receive the enriched polymer or polymer-based bubbles 18 and provide reclaimed polymer or polymer-based bubbles 52 without the valuable material attached thereon so as to enable the reuse of the polymer or polymer-based bubbles 52 in a closed loop process. By way of example, the bead recovery process or processor 50 may take the form of a washing station whereby the valuable mineral is mechanically, chemically, or electro-statically removed from the polymer or polymer-based bubbles 18.

The bead recovery process or processor 50 may include a releasing apparatus in the form of a second flotation cell or column 54 having piping 56 with a valve 56*a* configured to receive the enriched polymer bubbles or beads 18; and substantially release the valuable material from the polymer bubbles or beads 18, and also having a top part or piping 57 configured to provide the reclaimed polymer bubbles or beads 52, substantially without the valuable material attached thereon The second flotation cell or column 54 may be configured to contain a release rich environment, including where the release rich environment has a low pH, or including where the release rich environment results from ultrasonic waves pulsed into the second flotation cell or column 54.

The bead recovery process or processor 50 may also include piping 58 having a valve 58*a* for providing concentrated minerals to a thickener 60 configured to receive the concentrated minerals from the flotation cell or column 54. The thickener 60 includes piping 62 having a valve 62*a* to provide thickened concentrate. The thickener 60 also includes suitable piping 64 for providing reclaimed water back to the second flotation cell or column 54 for reuse in the process. Thickeners like element 60 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

FIG. 1*b* shows the apparatus 10 according to another embodiment of present invention. As shown in FIG. 1*b*, the flotation cell or column 12 is configured to receive a mixture of fluid (e.g. water and a magnetically-responsive surfactant), a pulp slurry 14 and air 71, and to provide enriched air bubbles 19 which are mostly in the froth layer near the top portion 20. The froth layer may contain hydrophobic mineral particles attached to air bubbles and mineral particles already detached from the air bubbles. For simplicity, both the attached or detached mineral particles are herein referred to as enriched air bubbles. An agitator 27 may also be used to produce air bubbles from the air 71 released into the flotation column 12.

FIG. 1*c* shows an embodiment of the present invention. As shown in FIG. 1*c*, air 71 is released into the flotation cell or column 12 through an inlet toward the agitator 27 which produces air bubbles. A magnetically-responsive surfactant is released into the flotation cell or column 12 via a feed 49. Steering of the froth 73 can then be controlled via a magnetic steering mechanism 29 which comprises magnetic induction coils 31, 33 above the froth layer, or embedded in the walls of the flotation cell or column 12. The magnetic steering mechanism 29 can be used to stir the froth at an acceptably low rate (so that the natural kinetics of the froth are not disturbed), sweep 'pockets' of froth from locations where it would otherwise experience long residence times etc., and effectively ensure that the froth transport and residence time is more uniform for the whole cell. As shown in FIG. 1*c*, two coils 31, 33 are illustrated, driven by controllable currents $I_1$ and $I_2$. It should be understood by a person skilled in the art that many different configurations are feasible to provide multiple control/steerage of the froth transport.

FIG. 1*d* shows another embodiment of the present invention. As shown in FIG. 1*d*, synthetic or polymer beads or bubbles 70 are released into the flotation cell or column 12 through an inlet to be mixed with pulp slurry in the flotation cell or column 12. A magnetically-responsive surfactant is released into the flotation cell or column 12 via a feed 49. Steering of the froth 73 can then be controlled via a magnetic steering mechanism 29 which comprises magnetic induction coils 31, 33 above the froth layer, or embedded in the walls of the flotation cell or column 12.

FIG. 1*e* shows yet another embodiment of the present invention. As shown in FIG. 1*e*, magnetic synthetic or polymer beads or bubbles 70 are released into the flotation cell or column 12 through an inlet to be mixed with the pulp slurry in the flotation cell or column 12. As such, the pulp slurry and the magnetic polymer bubbles form a magnetically responsive medium to be steered using a magnetic steering mechanism 29 which comprises magnetic induction coils 31, 33.

FIG. 1*f* shows a different embodiment of the present invention. As shown in FIG. 1*f*, synthetic or polymer beads or bubbles 70 are released into the flotation cell or column 12 through an inlet to be mixed with the pulp slurry in the flotation cell or column 12. Magnetic particles are released into the flotation cell or column 12 via a feed 51 to be dispersed in the pulp slurry. As such, the pulp slurry, the polymer bubbles and the magnetic particles form a magnetically responsive medium to be steered using a magnetic steering mechanism 29 which comprises magnetic induction coils 31, 33.

Magnetically Responsive Surfactant and Fluid

Magnetically-responsive surfactants for use in the flotation separation processes according various embodiments of the present invention may be ionic liquid surfactants that contain magneto-active metal complex anions, such as $FeCl_4^-$, $FeCl_3Br^-$ or the like. Alternatively, the flotation cell or column may contain magnetic colloidal particles dispersed in the fluid. Regarding the magnetically responsive surfactants or fluid, the present invention is mainly concerned with using a controllable magnetic field generated by a magnetic field generator to control and modulate the froth transport so as to minimize or eliminate the regions in flotation cell wherein the froth residence time is too long, allowing the minerals to recycle back into the cell. In the flotation cell or column where synthetic beads or bubbles in pulp slurry are used to collect valuable material, magnetic stirring of the pulp slurry could increase the contact between the synthetic beads or bubbles and the valuable material.

FIGS. 2*a*-2*b*: The Collision Technique

FIG. 2*a* shows alternative apparatus generally indicated as 200 in the form of an alternative flotation cell 201 that is based at least partly on a collision technique between the mixture and the synthetic bubbles or beads, according to some embodiments of the present invention. The mixture 202, e.g. the pulp slurry, may be received in a top part or piping 204, and the synthetic bubbles or beads 206 may be received in a bottom part or piping 208. The flotation cell 201 may be configured to include a first device 210 for receiving the mixture 202, and also may be configured to include a second device 212 for receiving the polymer-based materials. The first device 210 and the second device 212 are configured to face towards one another so as to provide the mixture 202 and the synthetic bubbles or beads 206, e.g., polymer or polymer-based materials, using the collision technique. In FIG. 2*a*, the arrows 210*a* represent the mixture being sprayed, and the arrows 212*a* represent the synthetic bubbles or beads 206 being sprayed towards one another in the flotation cell 201.

In operation, the collision technique causes vortices and collisions using enough energy to increase the probability of touching of the polymer or polymer-based materials 206 and the valuable material in the mixture 202, but not too much energy to destroy bonds that form between the polymer or polymer-based materials 206 and the valuable material in the mixture 202. Pumps, not shown, may be used to provide the mixture 202 and the synthetic bubbles or beads 206 are the appropriate pressure in order to implement the collision technique.

By way of example, the first device 210 and the second device 212 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 202 and the synthetic bubbles or beads 206 towards one another, as well as the appropriate pumping pressure in order to provide enough energy to increase the probability of touching of the polymer or polymer-based materials 206 and the valuable material in the mixture 202, but not too much energy to destroy bonds that form between the polymer or polymer-based materials 206 and the valuable material in the mixture 202.

As a result of the collision between the synthetic bubbles or beads 206 and the mixture, enriched synthetic bubbles or beads having the valuable material attached thereto will float to the top and form part of the froth in the flotation cell 201. The flotation cell 201 may include a top part or piping 214 configured to provide enriched synthetic bubbles or beads 216, e.g., enriched polymer bubbles as shown, having the valuable material attached thereto, which may be further processed consistent with that set forth herein.

The alternative apparatus 200 may be used in place of the flotation columns or cells, and inserted into the apparatus or system shown in FIG. 1*a*, and may prove to be more efficient than using the flotation columns or cells. As with the apparatus 10 as shown in FIG. 1*a*, the apparatus 200 also has a magnetic steering mechanism 29 provided near the top portion of the flotation cell 201 configured to steer the froth as the froth also contains a magnetically-responsive surfactant.

According to another embodiment of the present invention, the collision technique can also be used in place of the flotation columns or cells, or inserted into the apparatus or system shown in FIG. 1*b*. As shown in FIG. 2*b*, air 207 may be received in the bottom part of piping 208. As a result of the collision between air and the pulp slurry, the air bubbles having valuable material attached thereto will float to the top and form part of the froth in the flotation cell 201. A magnetic steering mechanism 29 provided near the top portion of the flotation cell 201 configured to steer the froth as the froth also contains a magnetically-responsive surfactant. The flotation cell 201 may include a top part of piping 214 configured to provide enriched air bubbles 217 (containing value material attached or detached from air bubbles). The enriched air bubbles 217 may be further processed consistent with that set forth herein.

FIGS. 3*a*-5*d*: The Synthetic Bubbles or Beads

The bubbles or beads used in mineral separation are referred herein as synthetic bubbles or beads. At least the surface of the synthetic bubbles or beads has a layer of polymer functionalized to attract or attach to the value material or mineral particles in the mixture. The term "polymer bubbles or beads", and the term "synthetic bubbles or beads" are used interchangeably. The term "polymer" in this specification means a large molecule made of many units of the same or similar structure linked together. The unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. The list is not necessarily exhaustive. Thus, the synthetic material can be hard or rigid like plastic or soft and flexible like an elastomer. While the physical properties of the synthetic beads can vary, the surface of the synthetic beads is chemically functionalized to provide a plurality of functional groups to attract or attach to mineral particles. (By way of example, the term "functional group" may be understood to be a group of atoms responsible for the characteristic reactions of a particular compound, including those define the structure of a family of compounds and determine its properties.)

Figure 3B:
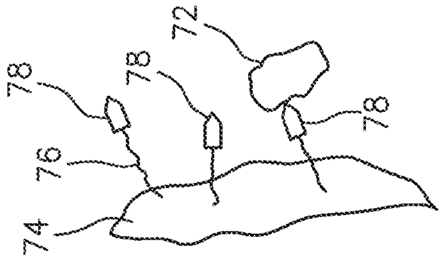
FIG. 3*b* illustrates an enlarged portion of the synthetic bead showing a molecule or molecular segment for attaching a function group to the surface of the synthetic bead, according to some embodiments of the present invention.
Figure 3A:
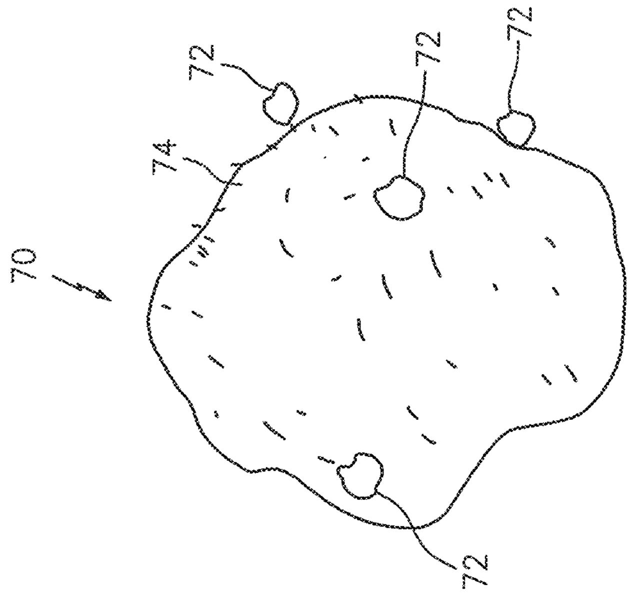
FIG. 3*a* shows a generalized synthetic bead which can be a size-based bead or bubble, weight-based polymer bead and bubble, and magnetic-based bead and bubble, according to some embodiments of the present invention.

For aiding a person of ordinary skill in the art in understanding various embodiments of the present invention, FIG. 3*a* shows a generalized synthetic bead and FIG. 3*b* shows an enlarged portion of the surface. The synthetic bead can be a size-based bead or bubble, weight-based polymer bead and bubble, and/or magnetic-based bead and bubble. As shown in FIGS. 3*a* and 3*b*, the synthetic bead 70 has a bead body to provide a bead surface 74. At least the outside part of the bead body is made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral, such as copper to the surface 74. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines. Similarly, a chelating agent can be incorporated into or onto the polymer as a collector site for attracting a mineral, such as copper. As shown in FIG. 3*b*, a mineral particle 72 is attached to the functional group 78 on a molecule 76. In general, the mineral particle 72 is much smaller than the synthetic bead 70. Many mineral particles 72 can be attracted to or attached to the surface 74 of a synthetic bead 70.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 70 has a bead body 80 having a surface comprising a plurality of molecules with one or more functional groups for attracting mineral particles to the surface. A polymer having a functional group to collect mineral particles is referred to as a functionalized polymer. In one embodiment, the entire interior part 82 of the synthetic bead 80 is made of the same functionalized material, as shown in FIG. 4*a*. In another embodiment, the bead body 80 comprises a shell 84. The shell 84 can be formed by way of expansion, such as thermal expansion or pressure reduction. The shell 84 can be a micro-bubble or a balloon. In FIG. 4*b*, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 84 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 4*c*, the synthetic bead has a core 90 made of ceramic, glass or metal and only the surface of core 90 has a coating 88 made of functionalized polymer. The core 90 can be a hollow core or a filled core depending on the application. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 70 can be a porous block or take the form of a sponge or foam with multiple segregated gas filled chambers. The combination of air and the synthetic beads or bubbles 70 can be added to traditional naturally aspirated flotation cell.

It should be understood that the term "bead" does not limit the shape of the synthetic bead of the present invention to be spherical, as shown in FIG. 3. In some embodiments of the present invention, the synthetic bead 70 can have an elliptical shape, a cylindrical shape, a shape of a block. Furthermore, the synthetic bead can have an irregular shape.

Figure 5C:
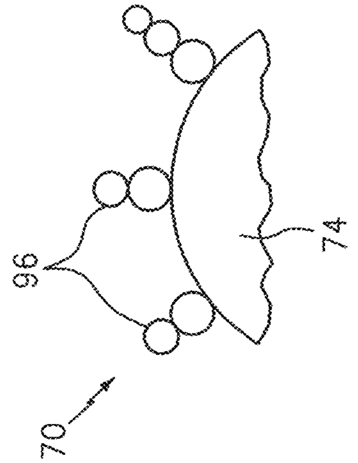
FIG. 5*c* illustrates the surface of a synthetic bead with stacked beads, according to some embodiments of the present invention.
Figure 5B:
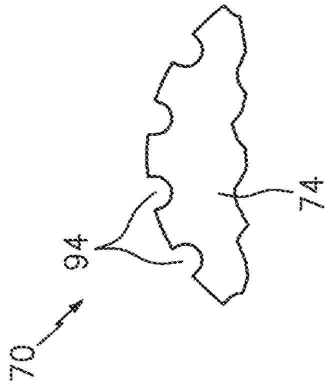
FIG. 5*b* illustrates the surface of a synthetic bead with dents and/or holes, according to some embodiments of the present invention.
Figure 5A:
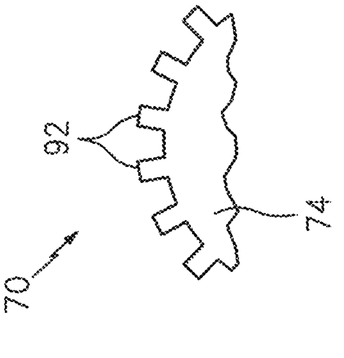
FIG. 5*a* illustrates the surface of a synthetic bead with grooves and/or rods, according to some embodiments of the present invention.
Figure 5D:
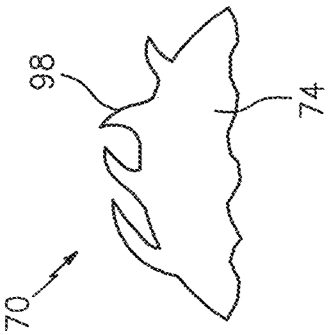
FIG. 5*d* illustrates the surface of a synthetic bead with hair-like physical structures, according to some embodiments of the present invention.

It should also be understood that the surface of a synthetic bead, according to the present invention, is not limited to an overall smooth surface as shown in FIG. 3*a*. In some embodiments of the present invention, the surface can be irregular and rough. For example, the surface 74 can have some physical structures 92 like grooves or rods as shown in FIG. 5*a*. The surface 74 can have some physical structures 94 like holes or dents as shown in FIG. 5*b*. The surface 74 can have some physical structures 96 formed from stacked beads as shown in FIG. 5*c*. The surface 74 can have some hair-like physical structures 98 as shown in FIG. 5*d*. In addition to the functional groups on the synthetic beads that attract mineral particles to the bead surface, the physical structures can help trapping the mineral particles on the bead surface. The surface 74 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. It is also possible to release the mineral particles carrying with the enriched synthetic beads by sonic agitation, such as ultrasonic waves.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same. Each hollow object, body, element or structure may be configured with a dimension so as not to absorb liquid, including water, including where the dimension is in a range of about 20-30 microns. Each hollow object, body, element or structure may be made of glass or a glass-like material, as well as some other suitable material either now known or later developed in the future.

By way of example, the multiplicity of hollow objects, bodies, elements or structures that are received in the mixture may include a number in a range of multiple thousands of bubbles or beads per cubic foot of mixture, although the scope of the invention is not intended to be limited per se to the specific number of bubbles. For instance, a mixture of about three thousand cubic feet may include multiple millions of bubbles or beads, e.g., having a size of about 1 millimeter, in three thousand cubic feet of the mixture.

The multiplicity of hollow objects, bodies, elements or structures may be configured with chemicals applied to prevent migration of liquid into respective cavities, unfilled spaces or holes before the wet concrete mixture cures, including where the chemicals are hydrophobic chemicals.

The one or more bubbles may take the form of a small quantity of gas, including air, that is trapped or maintained in the cavities, unfilled spaces, or holes of the multiplicity of hollow objects, bodies, elements or structures.

The scope of the invention is intended to include the synthetic bubbles or beads shown herein being made from a polymer or polymer-based material, or a silica or silica-based, or a glass or glass-based material.

Releasing Mechanism

Various embodiments of the present invention are envisioned as examples to show that the valuable minerals can be mechanically, chemically, thermally, optically or electromagnetically removed or released from the enriched synthetic beads or bubbles 18 (see FIG. 1*a*, for example) or the enriched air bubbles 19 (see FIG. 1*b*). The releasing of valuable minerals from the enriched synthetic beads or bubbles has been disclosed in PCT application no. PCT/US12/39591, entitled "Method and system for releasing mineral from synthetic bubbles and beads," filed 25 May 2012, which is incorporated by reference herein in its entirety.

Multi-Stage Removal of Valuable Material

Figure 6:
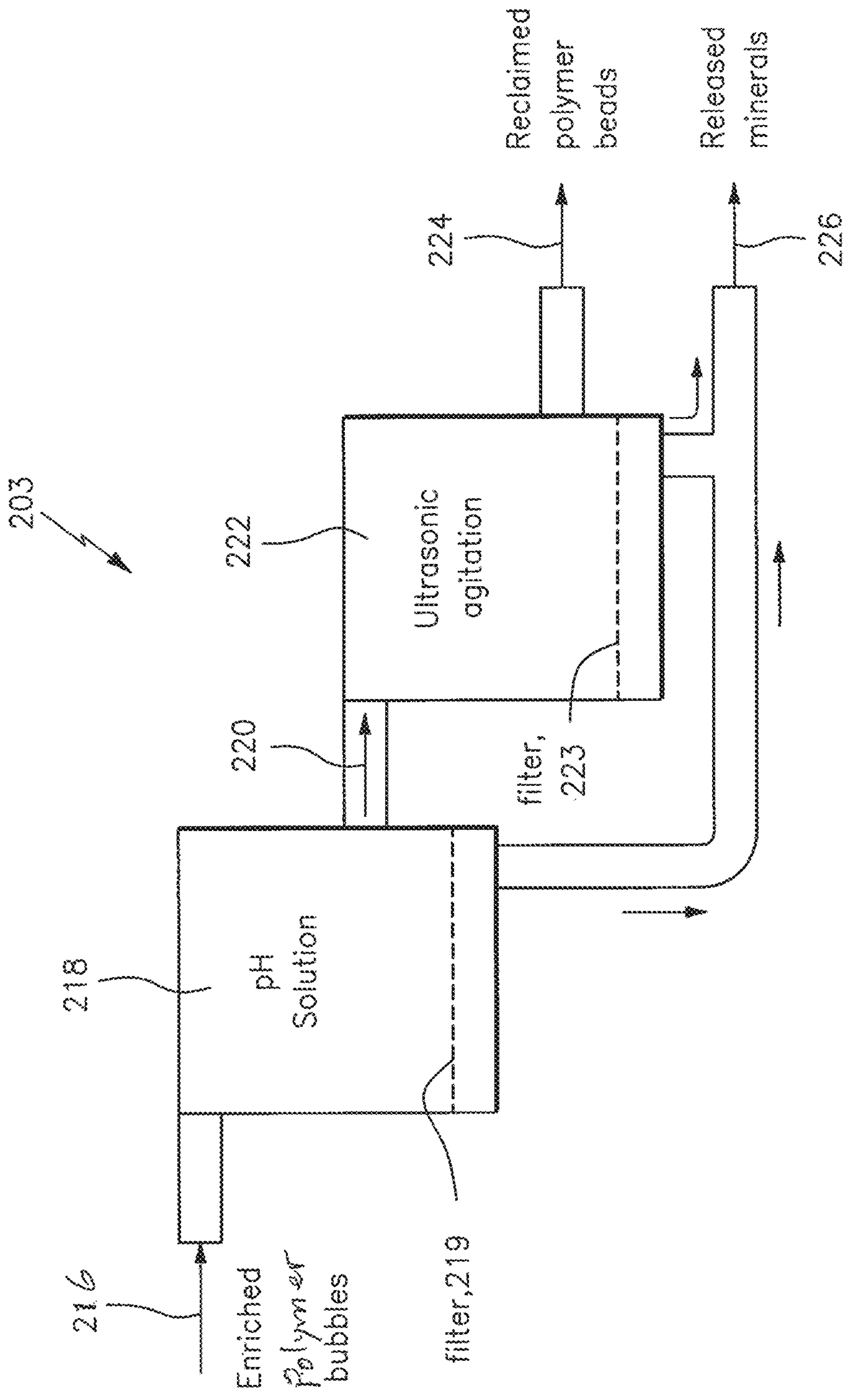
FIG. 6 is a diagram of a bead recovery processor in which the valuable material is removed from the polymer bubbles or beads in two or more stages, according to some embodiments of the present invention.

More than one of the methods for releasing the valuable material from the enriched synthetic bubbles or beads can be used in the same bead recovery process or processor at the same time. For example, while the enriched synthetic bubbles or beads 18 are subjected to ultrasonic agitation, the reclaimed water can also be heated by a water heater, such as a heater. Furthermore, an acidic solution can be also added to the water to lower the pH in the flotation column. In a different embodiment of the present invention, same or different releasing methods are used sequentially in different stages. By way of example, the enriched polymer bubbles 216 from the separation apparatus 200 (see FIG. 2*a*) can be processed in a multi-state processor 203 as shown in FIG. 6. The apparatus 200 has a first recovery processor 218 where an acidic solution is used to release the valuable material at least partially from the enriched polymer bubbles 216. A filter 219 is used to separate the released mineral 226 from the polymer bubbles 220. At a second recovery processor 222, an ultrasound source is used to apply ultrasonic agitation to the polymer bubbles 220 in order to release the remaining valuable material, if any, from the polymer bubbles. A filter 223 is used to separate the released mineral 226 from the reclaimed polymer bubbles 224. It is understood that more than two processing stages can be carried out and different combinations of releasing methods are possible.

Horizontal Pipeline

According to some embodiments of the present invention, the separation process can be carried out in a horizontal pipeline as shown in FIG. 7. For simplicity, synthetic bubbles or beads or air bubbles in this embodiment are referred to as bubbles 309, the enriched synthetic bubbles and enrich air bubbles are referred to as enriched bubbles 303. As shown in FIG. 7, bubbles 309 may be used in, or form part of, a size-based separation process using countercurrent flows with mixing implemented in apparatus such as a horizontal pipeline generally indicated as 300. In FIG. 7, the horizontal pipeline 310 is configured with a screen 311 to separate the enriched s bubbles 303 having the valuable material attached thereto from the mixture based at least partly on the difference in size. The horizontal pipeline 310 may be configured to separate the enriched bubbles 303 having the valuable material attached thereto from the mixture using countercurrent flows with mixing, so as to receive in the horizontal pipeline 310 slurry 304 flowing in a first direction A, receive in the horizontal pipeline 300 bubbles 309 flowing in a second direction B opposite to the first direction A, provide from the horizontal pipeline 308 the enriched bubbles 303 having the valuable material attached thereto and flowing in the second direction B, and provide from the horizontal pipeline 310 waste or tailings 306 that is separated from the mixture using the screen 311 and flowing in the second direction B. In a horizontal pipeline 310, it is not necessary that the bubbles 309 be lighter than the slurry 304. The density of the synthetic beads or bubbles 309 can be substantially equal to the density of the slurry 304 so that the synthetic beads or bubbles can be in a suspension state while they are mixed with slurry 304 in the horizontal pipeline 310. Since the froth containing a magnetically-response surfactant and enriched bubbles 303 is mostly located on the top part of the horizontal pipeline 310, a magnetic steering mechanism 29 can be used to steer the froth transport.

Figure 8B:
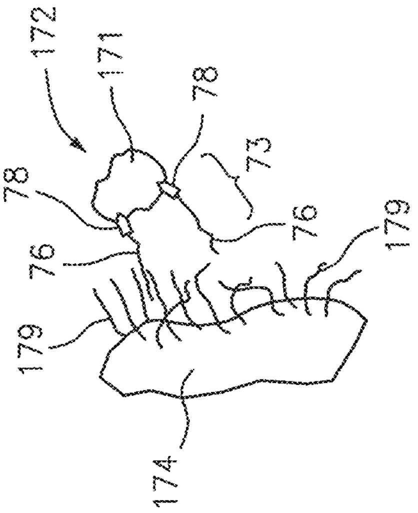
FIG. 8*b* illustrates an enlarged portion of the hydrophobic synthetic bead showing a wetted mineral particle attaching the hydrophobic surface of the synthetic bead.
Figure 8C:
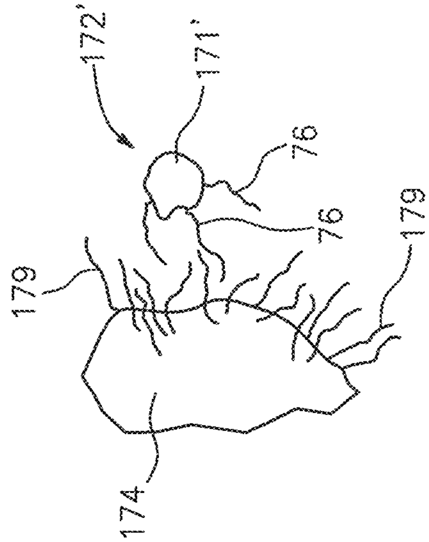
FIG. 8*c* illustrates an enlarged portion of the hydrophobic synthetic bead showing a hydrophobic non-mineral particle attaching the hydrophobic surface of the synthetic bead.
Figure 8A:
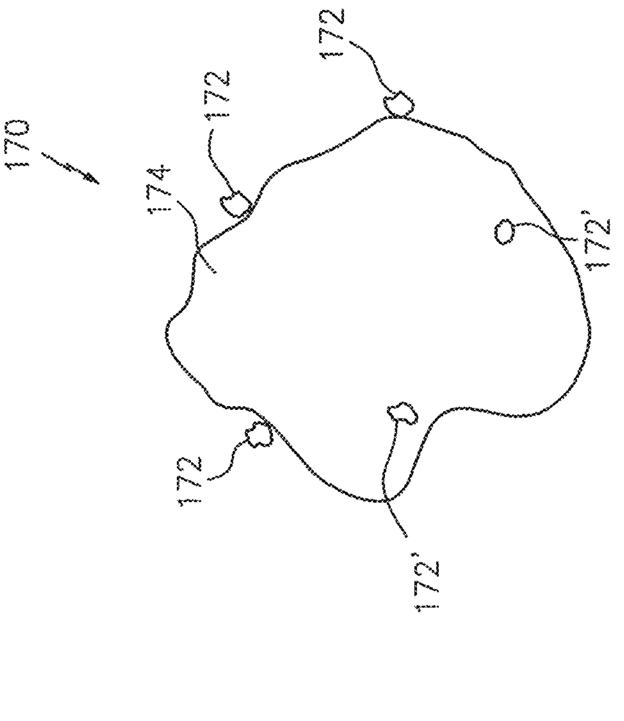
FIG. 8*a* shows a generalized synthetic bead functionalized to be hydrophobic, wherein the bead can be a size-based bead or bubble, weight-based polymer bead and bubble, and magnetic-based bead and bubble, according to some embodiments of the present invention.

It should be understood that the sized-based bead or bubble, weight-based bead or bubble, magnetic-based bead or bubble as described in conjunction with FIGS. 3*a*-5*d* can be functionalized to be hydrophobic so as to attract mineral particles. FIG. 8*a* shows a generalized hydrophobic synthetic bead, FIG. 8*b* shows an enlarged portion of the bead surface and a mineral particle, and FIG. 8*b* shows an enlarged portion of the bead surface and a non-mineral particle. As shown in FIG. 8*a* the hydrophobic synthetic bead 170 has a polymer surface 174 and a plurality of particles 172, 172' attached to the polymer surface 174. FIG. 8*b* shows an enlarged portion of the polymer surface 174 on which a plurality of molecules 179 rendering the polymer surface 174 hydrophobic.

A mineral particle 171 in the slurry, after combined with one or more collector molecules 73, becomes a wetted mineral particle 172. The collector molecule 73 has a functional group 78 attached to the mineral particle 171 and a hydrophobic end or molecular segment 76. The hydrophobic end or molecular segment 76 is attracted to the hydrophobic molecules 179 on the polymer surface 174. FIG. 8*c* shows an enlarged portion of the polymer surface 174 with a plurality of hydrophobic molecules 179 for attracting a non-mineral particle 172'. The non-mineral particle 172' has a particle body 171' with one or more hydrophobic molecular segments 76 attached thereto. The hydrophobic end or molecular segment 76 is attracted to the hydrophobic molecules 179 on the polymer surface 174. The term "polymer" in this specification means a large molecule made of many units of the same or similar structure linked together. Furthermore, the polymer associated with FIGS. 8*a*-8*c* can be naturally hydrophobic or functionalized to be hydrophobic. Some polymers having a long hydrocarbon chain or silicon-oxygen backbone, for example, tend to be hydrophobic.

Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

Figure 9B:
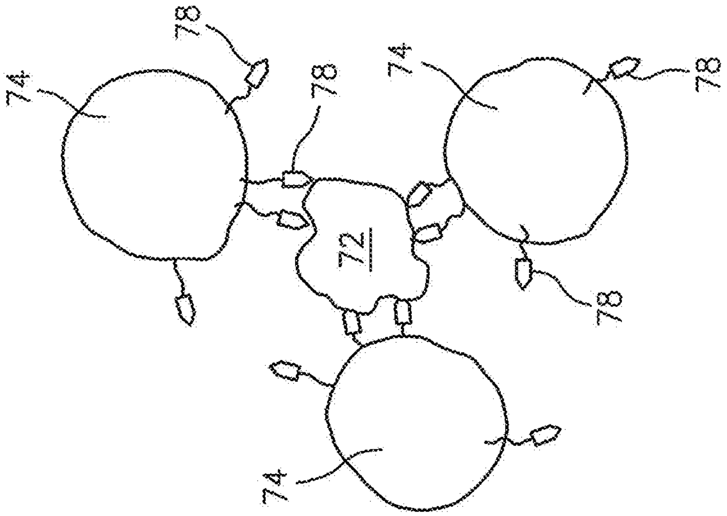
FIG. 9*b* illustrates a mineral particle being attached to a number of slightly larger synthetic beads at the same time.
Figure 9A:
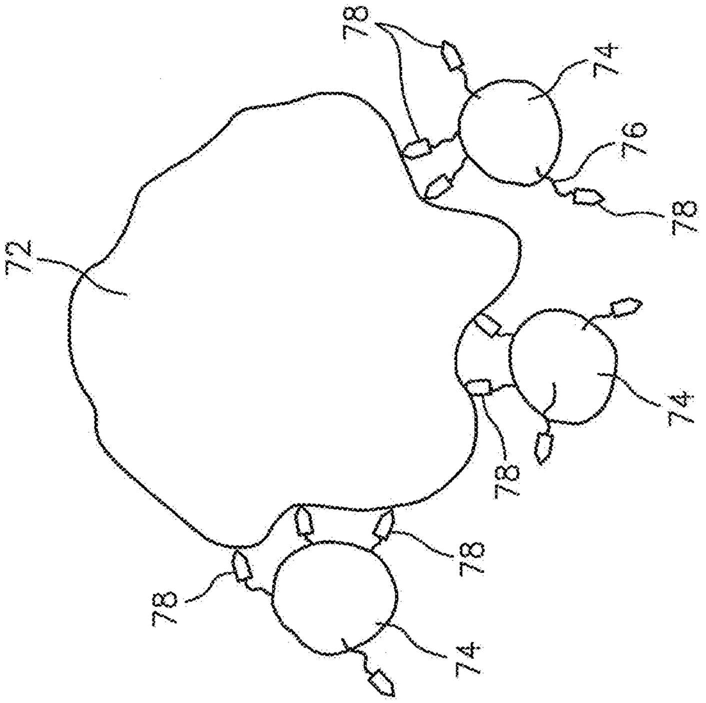
FIG. 9*a* illustrates a mineral particle being attached to a number of much smaller synthetic beads at the same time.

FIG. 9*a* illustrates a scenario where a mineral particle 72 is attached to a number of synthetic beads 74 at the same time. Thus, although the synthetic beads 74 are much smaller in size than the mineral particle 72, a number of synthetic beads 74 may be able to lift the mineral particle 72 upward in a flotation cell. Likewise, a smaller mineral particle 72 can also be lifted upward by a number of synthetic beads 74 as shown in FIG. 9*b*. In order to increase the likelihood for this "cooperative" lifting to occur, a large number of synthetic beads 74 can be mixed into the slurry. Unlike air bubbles, the density of the synthetic beads can be chosen such that the synthetic beads may stay along in the slurry before they rise to surface in a flotation cell.

Figure 10B:
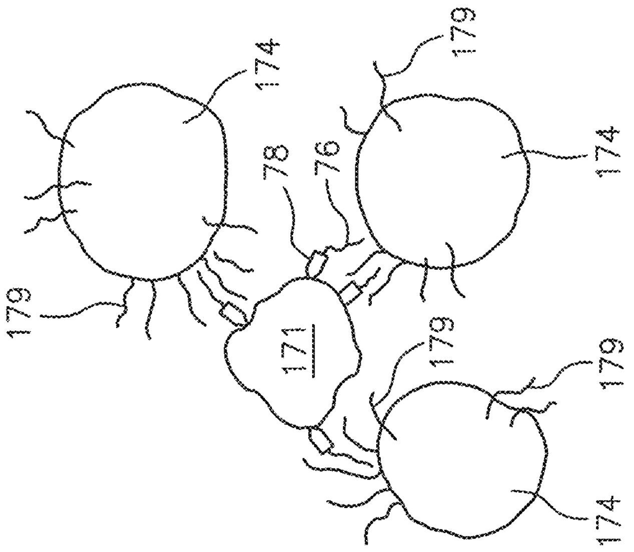
FIG. 10*b* illustrates a wetted mineral particle being attached to a number of slightly larger hydrophobic synthetic beads at the same time.
Figure 10A:
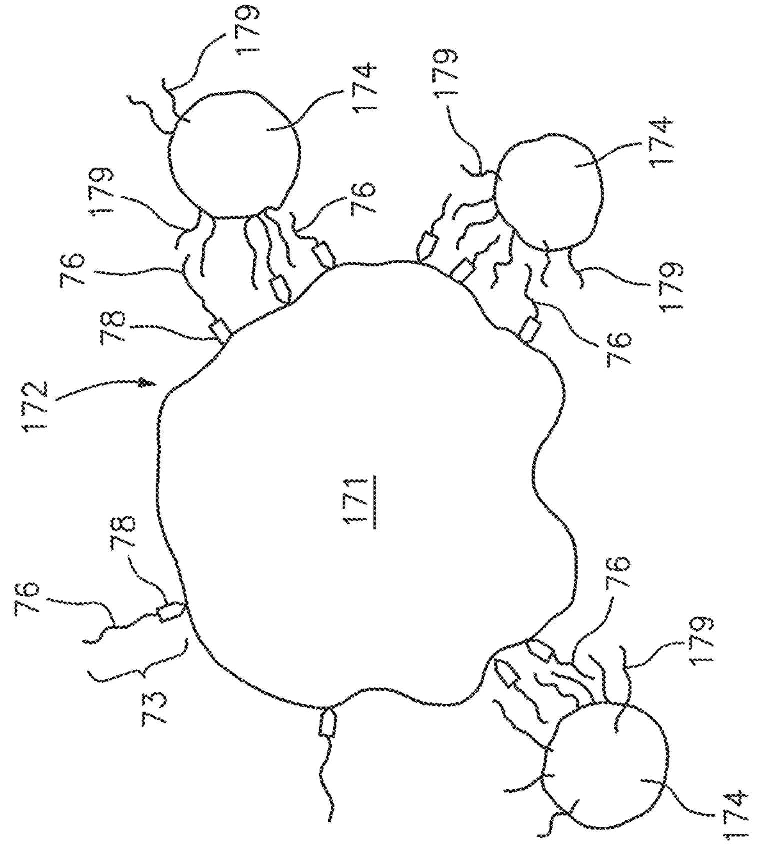
FIG. 10*a* illustrates a wetted mineral particle being attached to a number of much smaller hydrophobic synthetic beads at the same time.

FIGS. 10*a* and 10*b* illustrate a similar scenario. As shown, a wetted mineral particle 172 is attached to a number of hydrophobic synthetic beads 174 at the same time.

According to some embodiments of the present invention, only a portion of the surface of the synthetic bead is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
   a. Better cleaning as it may let the gangue to pass through
   b. Protects the attached mineral particle or particles from being knocked off, and
   c. Provides clearer rise to the top collection zone in the flotation cell.

Figure 11A:
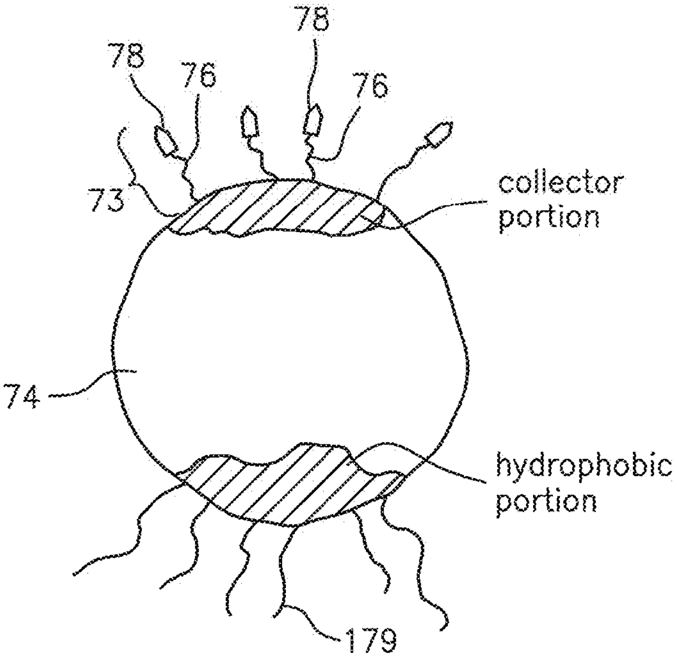
FIGS. 11*a* and 11*b* illustrate some embodiments of the present invention wherein the synthetic bead or bubble have one portion functionalized to have collector molecules and another portion functionalized to be hydrophobic.
Figure 11B:
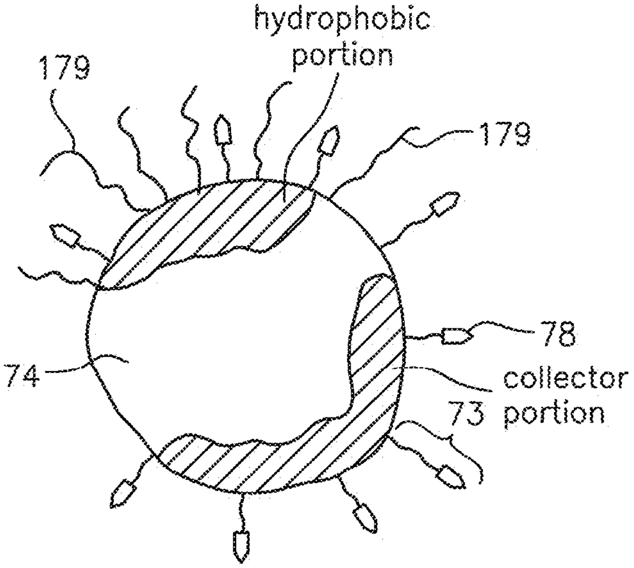

According to some embodiments of the present invention, one part of the synthetic bead is functionalized with collectors while another part of same synthetic bead is functionalized to be hydrophobic as shown in FIGS. 11*a* and 11*b*. As shown in FIG. 11*a*, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 179. In the embodiment as shown in FIG. 11*b*, the entire surface of the synthetic bead 74 can be functionalized to have collector molecules 73, but a portion of the surface is functionalized to have hydrophobic molecules 179 render it hydrophobic.

This "hybrid" synthetic bead can collect mineral particles that are wetted and not wetted.

Bitumen Recovery

Figure 14:
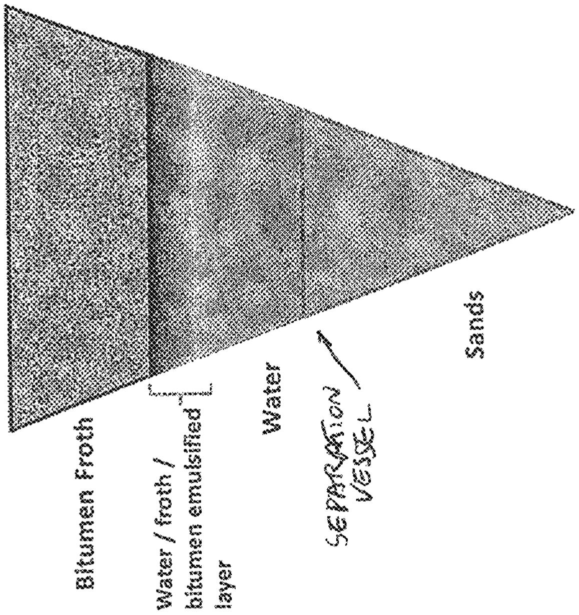
FIG. 14 (Prior Art)
FIG. 14 is a schematic diagram showing a typical separation vessel for gravitational separation of bitumen, wherein an emulsified layer is formed between the water and the bitumen froth, that is known in the art.
Figure 13:
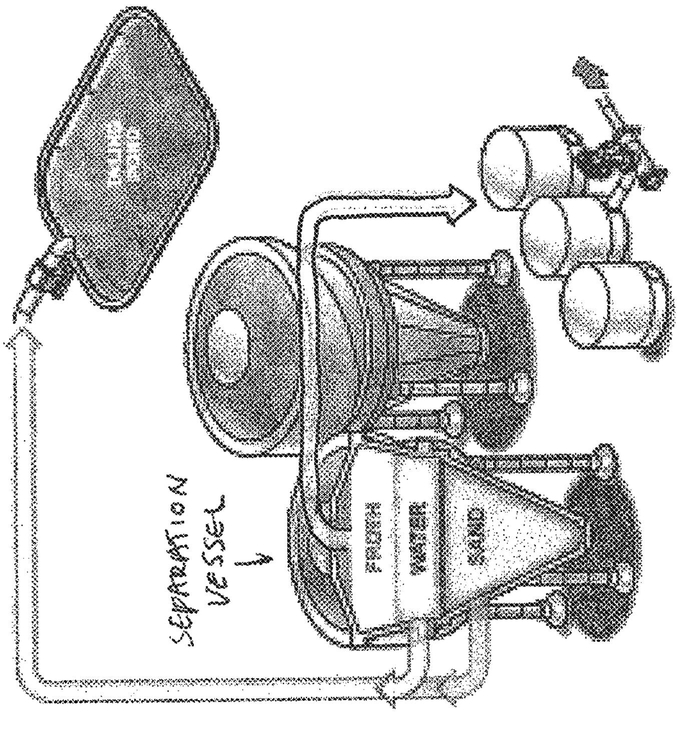
FIG. 13 (Prior Art)
FIG. 13 shows a typical bitumen recovery circuit for oil sands processing that is known in the art.

The concept of using a magnetic field to interact with the magnetically responsive medium in the flotation cell can also be use in bitumen recovery. A typical bitumen recovery circuit for oil sands processing is shown in FIG. 13, which is known in the art. In this typical bitumen recovery circuit, the sand, water and bitumen froth are separated in the separation vessel due to gravity. A schematic diagram of a typical separation vessel is shown in FIG. 14. As shown in FIG. 14, as the gravitation separation requires a long period to fully separate bitumen from water, a layer of emulsified water/bitumen froth exists.

Figure 15A:
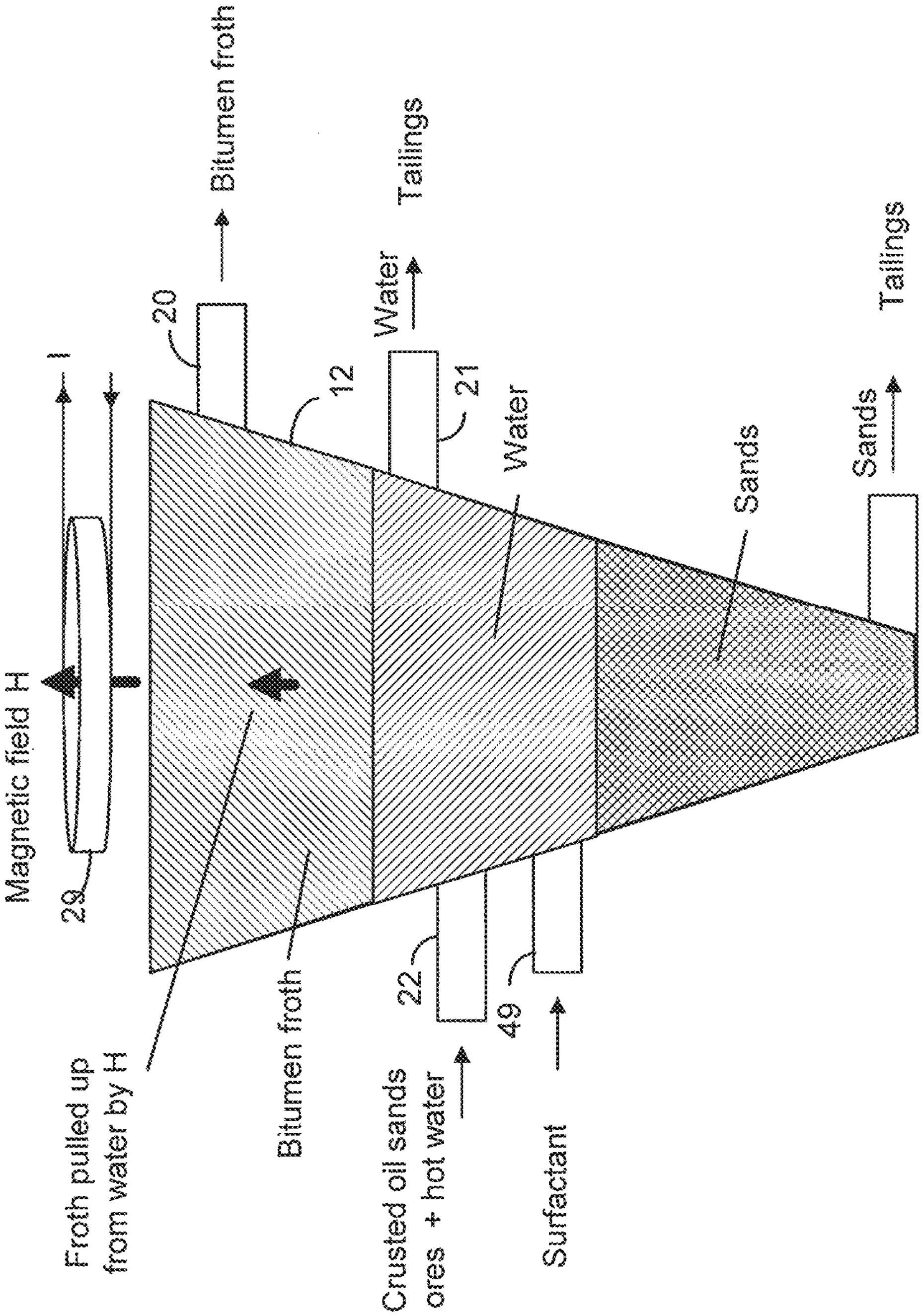
FIG. 15*a* is schematic diagram showing the separation vessel or flotation cell, according to some embodiments of the present invention.

In order to improve the bitumen separation process, the present invention uses a magnetic field to pull up the bitumen froth from the water layer. According to one embodiment of the present invention, a magnetically responsive surfactant is introduced into the separation vessel or flotation cell so that the froth becomes a magnetically responsive medium. In other words, magnetic surfactant is added to the separation process to produce a froth layer with magnetic properties. Since the froth layer contains the magnetically responsive surfactant, the gravitational separation in the separation vessel or flotation cell can be magnetically assisted and enhanced. As shown in FIG. 15*a*, the separation vessel or flotation cell 12 has a piping 22 arranged to intake crusted oil sands ores and hot water; a port or piping 49 arranged to intake a magnetically responsive surfactant. As the froth contains the magnetically responsive surfactant, a magnetic field generated by a magnetic field generator 29 can be used to pull the froth up from the water layer. The froth can be extracted from the top portion or piping 20. The sand in the bottom part of the flotation cell 12 can be discharged from the piping 26 as tailings. In addition, a piping 21 can be used to discharge the water from the flotation cell 12 to the tailings. In the separation vessel 12, the magnetically responsive surfactant and part of the bitumen/water/froth form a magnetically responsive medium. In order to make use of the magnetic field, the magnetic field generator 29 (whether a magnetic coil or a permanent magnet) is placed in a proper location so that the generated magnetic field H can interact with the magnetically responsive medium. The magnetic field, together with the magnetically responsive surfactant, should produce more rapid separation dynamics as compared to gravity alone as the froth can be "magnetically pulled" up out of the water layer. This can lead to better separation and reducing the "residence" time in the separation vessel or flotation cell, thus, increasing throughput. It should be noted that, magnetic particles can also be used in lieu of the magnetically responsive surfactant. As the magnetic particles are mixed with the bitumen froth to form a magnetically responsive medium, the bitumen broth can also be pulled up out of the water layer. The magnetic particles have been described in conjunction with FIG. 1*f*.

Figure 15B:
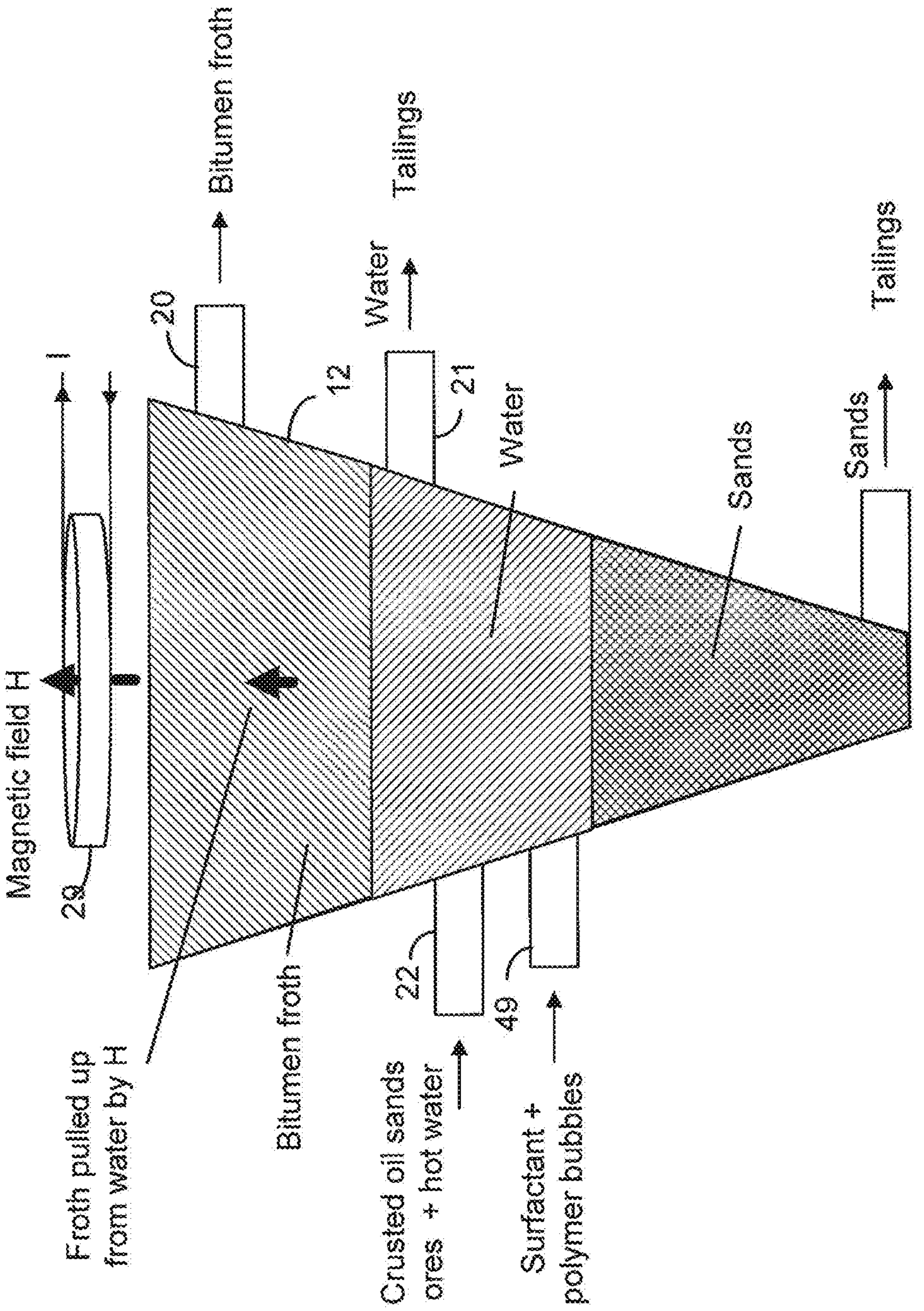
FIG. 15*b* is schematic diagram showing the separation vessel or flotation cell, according to some embodiments of the present invention.

In another embodiment of the present invention, a piping 24 can be used to introduce polymer bubbles 70 into the separation vessel or flotation cell 12 in order to help pushing the bitumen upward to form the bitumen froth as shown in FIG. 15*b*. In this embodiment, the bitumen froth extract from the separation vessel or flotation cell 12 would contain the polymer bubbles. The bitumen froth can be separated from the polymer bubbles in a second flotation cell 54, similar to that illustrated in FIG. 1*a*.

Figure 15C:
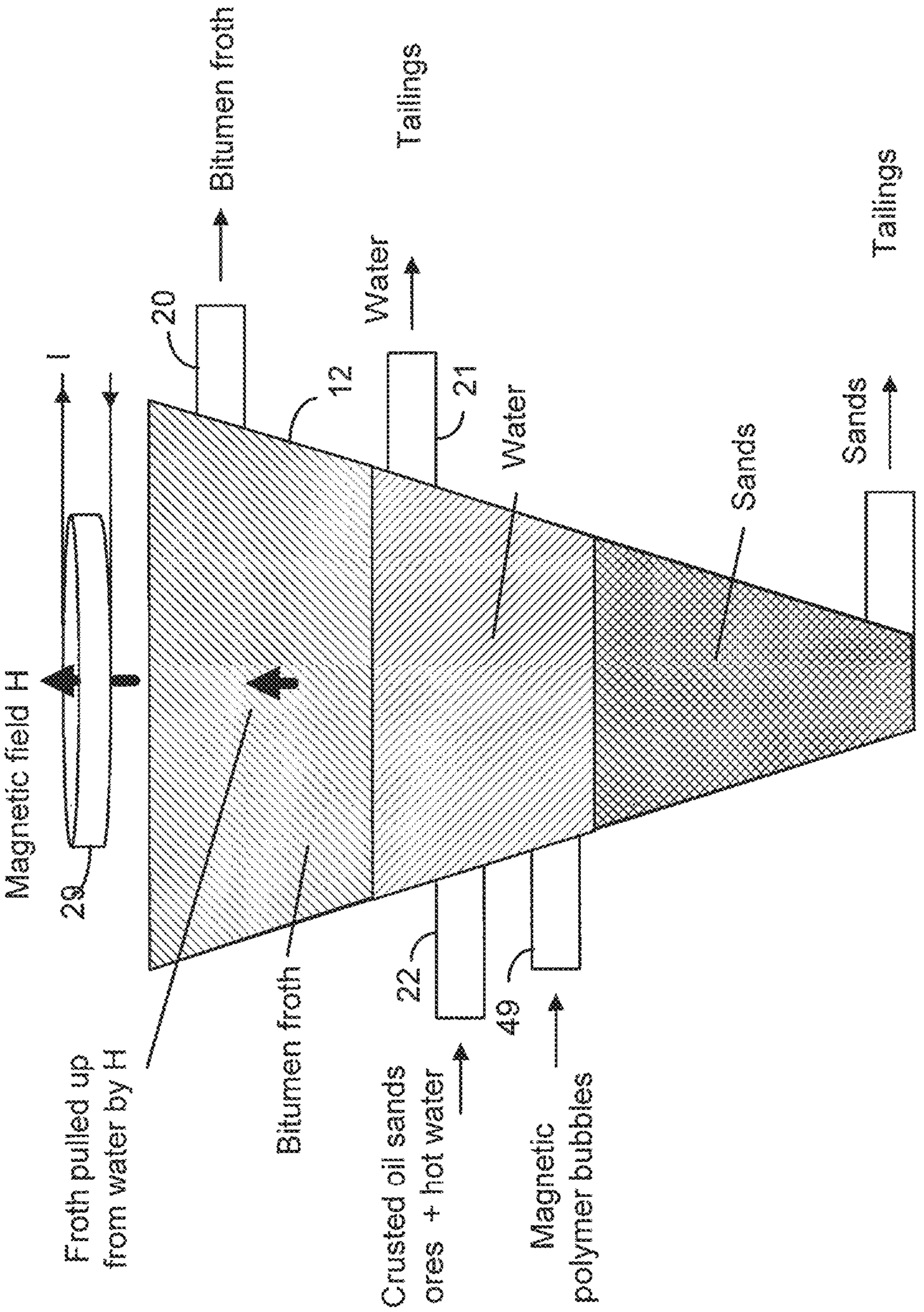
FIG. 15*c* is schematic diagram showing the separation vessel or flotation cell, according to some embodiments of the present invention.

In a different embodiment of the present invention, magnetic polymer bubbles 70 are introduced into the separation vessel or flotation cell 12 as shown in FIG. 15*c*. The advantages of the magnetic polymer bubbles include are: 1) the buoyancy of the magnetic polymer bubbles may push the bitumen/water mixture upward more rapidly than the air bubbles in the sand; and 2) the bitumen froth containing the magnetic polymer bubbles can be stirred and pulled up out of the water layer more rapidly than gravity alone.

Figure 16:
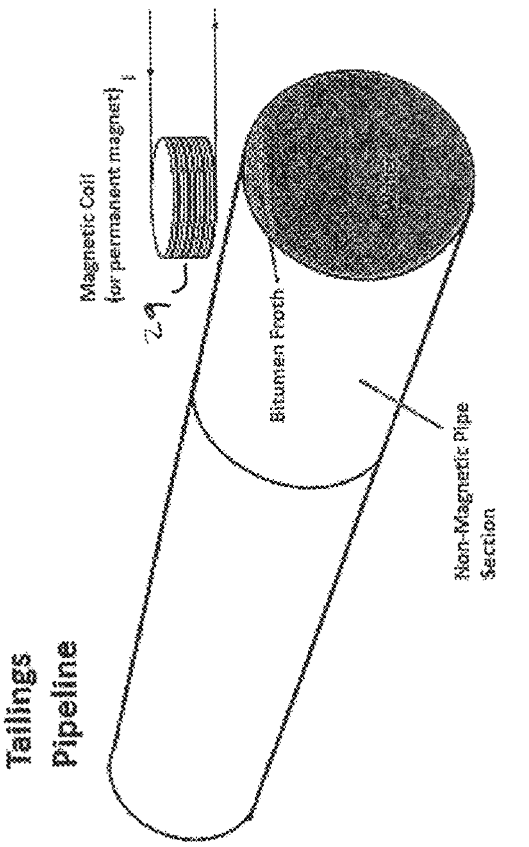
FIG. 16 is a diagram of a tailings pipeline having magnetic coil arranged in relation to a non-magnetic pipe section, according to some embodiments of the present invention.
Figure 17:
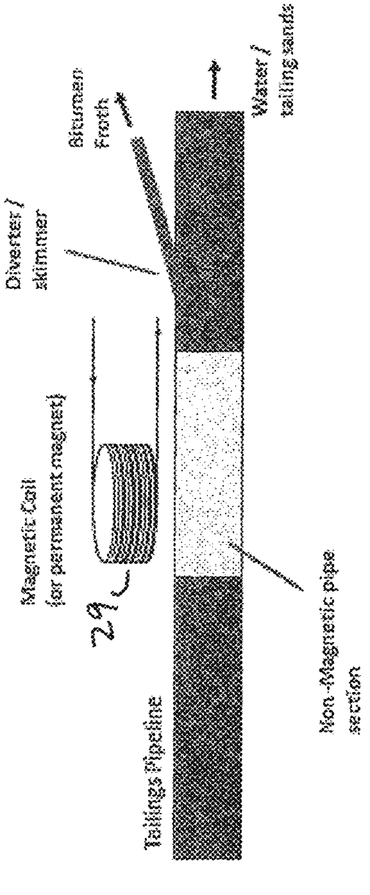
FIG. 17 is a diagram of a tailings pipeline having magnetic coil arranged in relation to a non-magnetic pipe section, according to some embodiments of the present invention.

The concept of the magnetically attracted bitumen froth can also be applied to a tailing line as shown in FIGS. 16 and 17. When a magnetic field generator 29 is placed near or in part of a tailings pipeline, residual bitumen (containing magnetically responsive surfactant or magnetic particles) in the tailing stream can be magnetically steered, or lifted from the process to enhance other mechanical skimmers/diverters and the like.

Applications

The scope of the invention is described in relation to mineral separation, including the separation of copper from ore. It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

The scope of the invention is intended to include other types or kinds of applications either now known or later developed in the future, e.g., including a flotation circuit, leaching, smelting, a gravity circuit, a magnetic circuit, or water pollution control.

The Scope of the Invention

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow). Although the invention has been described and illustrated with respect to exemplary embodiments thereof, the foregoing and various other additions and omissions may be made therein and thereto without departing from the spirit and scope of the present invention.

What is claimed is:

1. A method for non-mechanical stirring of a froth layer in a processor forming part of a mining operation, comprising:

providing in a processor a pulp slurry mixture having a pulp slurry with a mineral-particle-of-interest and a surfactant with magnetic properties;

configuring the processor as a pipe, including a tailings pipeline;

agitating the pulp slurry mixture to cause a formation of a magnetically responsive froth layer having at least some of the mineral-particle-of-interest at a top portion of the processor; and generating a magnetic field with a magnetic field generator to provide non-mechanical mixing, steering and driving of the magnetically responsive froth layer on the top portion of the processor.

2. The method according to claim 1, wherein the mineral-particle-of-interest is mineral-bearing ore particles.

3. The method according to claim 1, wherein the mineral-particle-of-interest is bitumen.

4. The method according to claim 1, wherein the method comprises configuring the processor as a flotation tank or a primary separation vessel (PSV).

5. The method according to claim 1, wherein the method comprises configuring the pipe with a non-magnetic pipe section, and configuring the magnetic field generator with a magnetic coil arranged in relation to the non-magnetic pipe section to generate the magnetic field and provide the non-mechanical mixing and steering/driving of the froth layer in the pipe.

6. The method according to claim 5, wherein the method comprises configuring the pipe as a diverter/skimmer configured to provide a bitumen froth from the pipe.

7. The method according to claim 5, wherein the method comprises configuring the magnetic field generator with respective magnetic froth-steering coils $C_1$, $C_2$ configured to respond to respective controllable currents $I_1$, $I_2$.

8. The method according to claim 7, wherein the method comprises configuring the respective magnetic froth-steering coils $C_1$, $C_2$ at the top portion of the processor or embedding the respective magnetic froth-steering coils $C_1$, $C_2$ in a wall of the processor.

9. The method according to claim 1, wherein the method comprises agitating the pulp slurry mixture with air bubbles that float through the pulp slurry mixture, attract the mineral-particle-of-interest and cause the formation of the magnetically responsive froth layer.

10. The method according to claim 9, wherein the method comprises agitating the pulp slurry mixture with an agitator arranged in a bottom portion of the processor that mixes the pulp slurry mixture with the air bubbles.

11. The method according to claim 1, wherein the method comprises agitating the pulp slurry mixture with buoyant polymer air bubbles that float through the pulp slurry mixture, attract the mineral-particle-of-interest and cause the formation of the magnetically responsive froth layer.

12. The method according to claim 11, wherein the method comprises agitating the pulp slurry mixture with an agitator arranged in a bottom portion of the processor that mixes the pulp slurry mixture with the buoyant polymer air bubbles.

13. The method according to claim 1, wherein the method comprises providing the magnetic field to stir the magnetically responsive froth layer at a predetermined rate.

* * * * *